United States Patent
Nagae et al.

(10) Patent No.: US 7,647,450 B2
(45) Date of Patent: Jan. 12, 2010

(54) METHOD, COMPUTER AND COMPUTER SYSTEM FOR MONITORING PERFORMANCE

(75) Inventors: Ryosuke Nagae, Yokosuka (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 11/496,636

(22) Filed: Aug. 1, 2006

(65) Prior Publication Data

US 2007/0283091 A1    Dec. 6, 2007

(30) Foreign Application Priority Data

Jun. 5, 2006    (JP)    ............... 2006-155778

(51) Int. Cl.
*G06F 9/46* (2006.01)
*G06F 13/00* (2006.01)

(52) U.S. Cl. ............... 711/114; 718/5; 702/182

(58) Field of Classification Search ............... 711/114; 718/5

See application file for complete search history.

(56) References Cited

U.S. PATENT DOCUMENTS

| | | | |
|---|---|---|---|
| 6,748,489 B2 | 6/2004 | Soejima et al. | |
| 6,961,817 B2 | 11/2005 | Soejima et al. | |
| 7,209,863 B2 * | 4/2007 | Fukuda et al. | ............... 702/186 |
| 2002/0184575 A1 * | 12/2002 | Landan | ............... 714/47 |
| 2006/0085166 A1 * | 4/2006 | Ochi et al. | ............... 702/186 |

FOREIGN PATENT DOCUMENTS

| JP | 2005-157933 | 6/2005 |
|---|---|---|
| JP | 2006-107126 | 4/2006 |

* cited by examiner

*Primary Examiner*—Sheng-Jen Tsai
*Assistant Examiner*—Hamdy S Ahmed
(74) *Attorney, Agent, or Firm*—Volpe and Koenig, P.C.

(57) ABSTRACT

Performance of a storage subsystem is monitored at a proper level in a computer system having host computers, the storage subsystems, and a management computer. Each storage subsystem has physical disks and a disk controller to control input/output of the data to/from the physical disks. The disk controller provides storage areas of the physical disks as one or more logical volumes to the host computer. The management computer makes each of the logical volumes correspond to one of a plurality of groups, sets monitoring conditions of the logical volumes every group, monitors performance information of the logical volumes in accordance with the set monitoring conditions, and if a correspondence between the logical volume and the group is changed, changes the monitoring conditions set to at least one of the plurality of groups.

20 Claims, 18 Drawing Sheets

FIG. 3

| LOGICAL VOLUME # | COLLECTION ITEM NAME | COLLECTING INTERVAL | SUMMARIZING CONDITIONS | COLLECTING LEVEL GROUP |
|---|---|---|---|---|
| LV11 | I/O RESPONSE TIME | 1 MIN. | HOUR/DAY/WEEK/MONTH/YEAR | HIGH |
| LV11 | NUMBER OF I/O TIMES | 1 MIN. | HOUR/DAY/WEEK/MONTH/YEAR | HIGH |
| LV11 | DISK OCCUPATION RATIO | 1 MIN. | HOUR/DAY/WEEK/MONTH/YEAR | HIGH |
| LV11 | NUMBER OF CRC ERRORS | 1 MIN. | HOUR/DAY/WEEK/MONTH/YEAR | HIGH |
| LV12 | I/O RESPONSE TIME | 1 HOUR | DAY/WEEK/MONTH/YEAR | MIDDLE |
| LV12 | NUMBER OF I/O TIMES | 1 HOUR | DAY/WEEK/MONTH/YEAR | MIDDLE |
| LV12 | DISK OCCUPATION RATIO | 1 MIN. | HOUR/DAY/WEEK/MONTH/YEAR | MIDDLE |
| LV12 | NUMBER OF CRC ERRORS | 1 DAY | WEEK/MONTH/YEAR | MIDDLE |
| LV13 | I/O RESPONSE TIME | 1 DAY | WEEK/MONTH/YEAR | LOW |
| LV13 | NUMBER OF I/O TIMES | 1 DAY | WEEK/MONTH/YEAR | LOW |
| LV13 | DISK OCCUPATION RATIO | 1 DAY | WEEK/MONTH/YEAR | LOW |
| LV13 | NUMBER OF CRC ERRORS | NONE | — | LOW |

FIG. 4

| COLLECTING LEVEL GROUP 2221 | COLLECTION ITEM NAME 2222 | COLLECTING INTERVAL (IN THE NORMAL STATE) 2223 | COLLECTING INTERVAL (IN THE STATE OF AN INCREASE IN COLLECTING COSTS) 2224 | SUMMARIZING CONDITIONS (IN THE NORMAL STATE) 2225 | SUMMARIZING CONDITIONS (IN THE STATE OF AN INCREASE IN COLLECTING COSTS) 2226 | THRESHOLD VALUE 2227 |
|---|---|---|---|---|---|---|
| HIGH | I/O RESPONSE TIME | 1 MIN. | 1 MIN. | HOUR/DAY/WEEK/ MONTH/YEAR | DAY/WEEK/MONTH/ YEAR | 200 |
| | NUMBER OF I/O TIMES | 1 MIN. | 1 MIN. | HOUR/DAY/WEEK/ MONTH/YEAR | DAY/WEEK/MONTH/ YEAR | 30000 |
| | DISK OCCUPATION RATIO | 1 MIN. | 1 MIN. | HOUR/DAY/WEEK/ MONTH/YEAR | DAY/WEEK/MONTH/ YEAR | 70 |
| | NUMBER OF CRC ERRORS | 1 MIN. | 1 HOUR | HOUR/DAY/WEEK/ MONTH/YEAR | DAY/WEEK/MONTH/ YEAR | 0 |
| MIDDLE | I/O RESPONSE TIME | 1 HOUR | NONE | DAY/WEEK/ MONTH/YEAR | WEEK/MONTH/YEAR | 1000 |
| | NUMBER OF I/O TIMES | 1 HOUR | 1 HOUR | DAY/WEEK/ MONTH/YEAR | WEEK/MONTH/YEAR | 50000 |
| | DISK OCCUPATION RATIO | 1 MIN. | 1 MIN. | HOUR/DAY/WEEK/ MONTH/YEAR | DAY/WEEK/MONTH/ YEAR | 80 |
| | NUMBER OF CRC ERRORS | 1 DAY | 1 DAY | WEEK/MONTH/ YEAR | MONTH/YEAR | 0 |
| LOW | I/O RESPONSE TIME | 1 DAY | NONE | WEEK/MONTH/ YEAR | MONTH/YEAR | 5000 |
| | NUMBER OF I/O TIMES | 1 DAY | 1 DAY | WEEK/MONTH/ YEAR | MONTH/YEAR | 100000 |
| | DISK OCCUPATION RATIO | 1 DAY | 1 DAY | WEEK/MONTH/ YEAR | MONTH/YEAR | 90 |
| | NUMBER OF CRC ERRORS | NONE | NONE | — | — | — |

| LOGICAL VOLUME # | COLLECTION ITEM NAME | COLLECTING TIME | PERFORMANCE VALUE |
|---|---|---|---|
| LV11 | I/O RESPONSE TIME | 2005/5/25 23:00:00 | 100 |
| LV11 | NUMBER OF I/O TIMES | 2005/5/25 23:00:00 | 15000 |
| LV11 | DISK OCCUPATION RATIO | 2005/5/25 23:00:00 | 30 |
| LV11 | NUMBER OF CRC ERRORS | 2005/5/25 23:00:00 | 0 |
| LV12 | I/O RESPONSE TIME | 2005/5/25 23:00:00 | 500 |
| LV12 | NUMBER OF I/O TIMES | 2005/5/25 23:00:00 | 6000 |
| LV12 | DISK OCCUPATION RATIO | 2005/5/25 23:00:00 | 25 |
| LV13 | I/O RESPONSE TIME | 2005/5/25 23:01:00 | 95 |
| LV13 | NUMBER OF I/O TIMES | 2005/5/25 23:01:00 | 10000 |
| LV13 | DISK OCCUPATION RATIO | 2005/5/25 23:01:00 | 30 |
| LV13 | NUMBER OF CRC ERRORS | 2005/5/25 23:01:00 | 0 |
| LV12 | I/O RESPONSE TIME | 2005/5/25 23:01:00 | 600 |
| LV12 | NUMBER OF I/O TIMES | 2005/5/25 23:01:00 | 5000 |

FIG. 6

| DATA # | LOGICAL VOLUME # | LAYOUT PERIOD |
|---|---|---|
| 1030 | LV20 | 2005/1/27 14:00:00~2005/5/10 23:00:00 |
| 1030 | LV11 | 2005/5/10 23:00:00~now |
| 1028 | LV12 | 2005/1/27 14:00:00~now |
| 1010 | LV13 | 2005/1/27 14:00:00~now |
| 1033 | LV14 | 2005/1/27 14:00:00~now |
| 1070 | LV15 | 2005/1/27 14:00:00~now |
| 1005 | LV11 | 2005/1/27 14:00:00~2005/4/28 20:00:00 |
| 1005 | LV20 | 2005/4/28 20:00:00~now |
| 1074 | LV21 | 2005/1/27 14:00:00~now |
| 1056 | LV22 | 2005/1/27 14:00:00~now |
| 1024 | LV23 | 2005/1/27 14:00:00~now |
| 1036 | LV24 | 2005/1/27 14:00:00~now |
| 1048 | LV31 | 2005/1/27 14:00:00~now |
| 1003 | LV32 | 2005/1/27 14:00:00~now |

FIG. 7

| LOGICAL VOLUME # 2251 | COLLECTION ITEM NAME 2252 | LAST COLLECTING TIME 2253 |
|---|---|---|
| LV11 | I/O RESPONSE TIME | 2005/5/25 23:00:00 |
| LV11 | NUMBER OF I/O TIMES | 2005/5/25 23:00:00 |
| LV11 | DISK OCCUPATION RATIO | 2005/5/25 23:00:00 |
| LV11 | NUMBER OF CRC ERRORS | 2005/5/25 23:00:00 |
| LV12 | I/O RESPONSE TIME | 2005/5/25 23:00:00 |
| LV12 | NUMBER OF I/O TIMES | 2005/5/25 23:00:00 |
| LV12 | DISK OCCUPATION RATIO | 2005/5/25 23:00:00 |
| LV12 | NUMBER OF CRC ERRORS | 2005/5/25 00:00:00 |

| LOGICAL VOLUME # 2271 | COLLECTING LEVEL GROUP 2272 |
|---|---|
| LV11 | HIGH |
| LV12 | MIDDLE |
| LV13 | LOW |

|  | 2261 | 2262 | 2263 |
|---|---|---|---|

| DATA # | LOGICAL VOLUME # | ACCESS FREQUENCY (NUMBER OF I/O TIMES) |
|---|---|---|
| 1030 | LV11 | 10000 |
| 1028 | LV12 | 5000 |
| 1010 | LV13 | 25000 |
| 1033 | LV14 | 30000 |
| 1070 | LV15 | 500 |
| 1005 | LV20 | 9000 |
| 1074 | LV21 | 4500 |
| 1056 | LV22 | 400 |
| 1024 | LV23 | 15000 |
| 1036 | LV24 | 3000 |
| 1048 | LV31 | 600 |
| 1003 | LV32 | 18000 |

| LOGICAL VOLUME # | STORAGE # |
|---|---|
| LV10 | 10 |
| LV11 | 10 |
| LV12 | 10 |
| LV13 | 10 |
| LV14 | 10 |
| LV21 | 20 |
| LV22 | 20 |
| LV23 | 20 |
| LV24 | 20 |
| LV25 | 20 |
| LV31 | 30 |
| LV32 | 30 |

| STORAGE # | ACCESS FREQUENCY (NUMBER OF I/O TIMES) |
|---|---|
| 10 | 19600 |
| 20 | 5375 |
| 30 | 1300 |

229

METHOD, COMPUTER AND COMPUTER SYSTEM FOR MONITORING PERFORMANCE

INCORPORATION BY REFERENCE

The present application claims priority from Japanese application JP2006-155778 filed on Jun. 5, 2006, the content of which is hereby incorporated by reference into this application.

BACKGROUND OF THE INVENTION

The invention relates to a computer system having a host computer, a storage subsystem, and a management computer and, more particularly, to a technique for monitoring performance of the storage subsystem.

In association with the spread of an SAN (Storage Area Network) technique, an increase in size and complication of the storage subsystem are rapidly progressing. Therefore, in storage management software to monitor the performance of the storage subsystem, it is demanded to monitor a larger number of monitoring targets at higher precision.

As a technique for realizing efficient data management, an ILM (Information Lifecycle Management) is being spread. In the ILM, a storage device or a volume is layered in accordance with characteristics including performance, reliability, a price, and the like. In the ILM, data is stored into a layer adapted to the data characteristics including a use value, an access frequency, and the like of the data.

For example, explanation will be made with respect to a case of a computer system including: an upper layer constructed by logical volumes which are provided by a storage subsystem having high performance; and a lower layer constructed by logical volumes which are provided by a reasonable storage subsystem whose performance is not so high. In this case, data whose emergency degree or use frequency is high is stored into the upper layer so that it can be accessed in a short time. On the other hand, data whose use frequency is low but which needs to be stored for a long period of time is stored into the lower layer while importance is attached to storing costs.

The storage management software has a function of managing performance of various resources constructing the storage subsystem. The resources constructing the storage subsystem include physical disks, ports, logical disks, and the like. For example, the storage management software collects and accumulates performance information of each resource. The storage management software rearranges the resources on the basis of the accumulated performance information. By such a method, the storage management software optimizes the performance of the storage subsystem.

For example, a technique for managing the performance of the logical volumes has been disclosed in U.S. Pat. No. 6,748,489 or U.S. Pat. No. 6,961,817. According to such a technique, the storage management software collects performance data from all of the logical volumes. The storage management software forms or moves the logical volumes on the basis of the collected performance data.

SUMMARY OF THE INVENTION

To monitor the performance of the storage subsystem of a large scale, a management server having the high performance to execute the storage management software is necessary. A heavy load is applied to the storage subsystem serving as a monitoring target.

On the other hand, the data having the different data characteristics including the use value, the access frequency, and the like exists mixedly among a large quantity of data which is stored in the storage subsystem of the large scale. Hitherto, the storage management software monitors the storage subsystem irrespective of the data characteristics of the data which is stored in the storage subsystem. Therefore, there is a problem in managing costs.

The invention is made in consideration of the foregoing problem and it is an object of the invention to provide a technique of monitoring performance of a storage subsystem at a proper level.

As a typical embodiment of the invention, there is provided a method of monitoring performance in a computer system comprising: one or more host computers each having a processor, a memory, and an interface; one or more storage subsystems which are connected to the host computers; and a management computer which is connected to the storage subsystems, wherein each of the storage subsystems has physical disks for storing data whose writing is requested by the host computer and a disk controller for controlling input/output of the data to/from the physical disks, the disk controller provides storage areas of the physical disks as one or more logical volumes to the host computer, and the management computer makes each of the logical volumes correspond to one of a plurality of groups, sets monitoring conditions of the logical volumes every group, monitors performance information of the logical volumes in accordance with the set monitoring conditions, and if a correspondence between the logical volume and the group is changed, changes the monitoring conditions set to at least one of the plurality of groups.

According to the typical embodiment of the invention, the performance of the storage subsystem can be monitored at the proper level.

Other objects, features and advantages of the invention will become apparent from the following description of the embodiments of the invention taken in conjunction with the accompanying drawings.

BRIEF DESCRIPTION OF THE DRAWINGS

FIG. 3 is a constructional diagram of a collection item information table which is stored in a management server in the first embodiment of the invention;

FIG. 4 is a constructional diagram of a collecting level group definition table which is stored in the management server in the first embodiment of the invention;

FIG. 5 is a constructional diagram of a performance information table which is stored in the management server in the first embodiment of the invention;

FIG. 6 is a constructional diagram of a data layout table which is stored in the management server in the first embodiment of the invention;

FIG. 7 is a constructional diagram of a last collecting time management table which is stored in the management server in the first embodiment of the invention;

FIG. 8 is a constructional diagram of a collecting level group management table which is stored in the management server in the first embodiment of the invention;

FIG. 13 is a constructional diagram of a data characteristics table which is stored in the management server in the second embodiment of the invention;

FIG. 17 is a constructional diagram of a volume management table which is stored in the management server in the third embodiment of the invention;

FIG. 18 is a constructional diagram of a storage characteristics table which is stored in the management server in the third embodiment of the invention;

DESCRIPTION OF THE EMBODIMENTS

Embodiments of the invention will be described hereinbelow with reference to the drawings.

Figure 1:
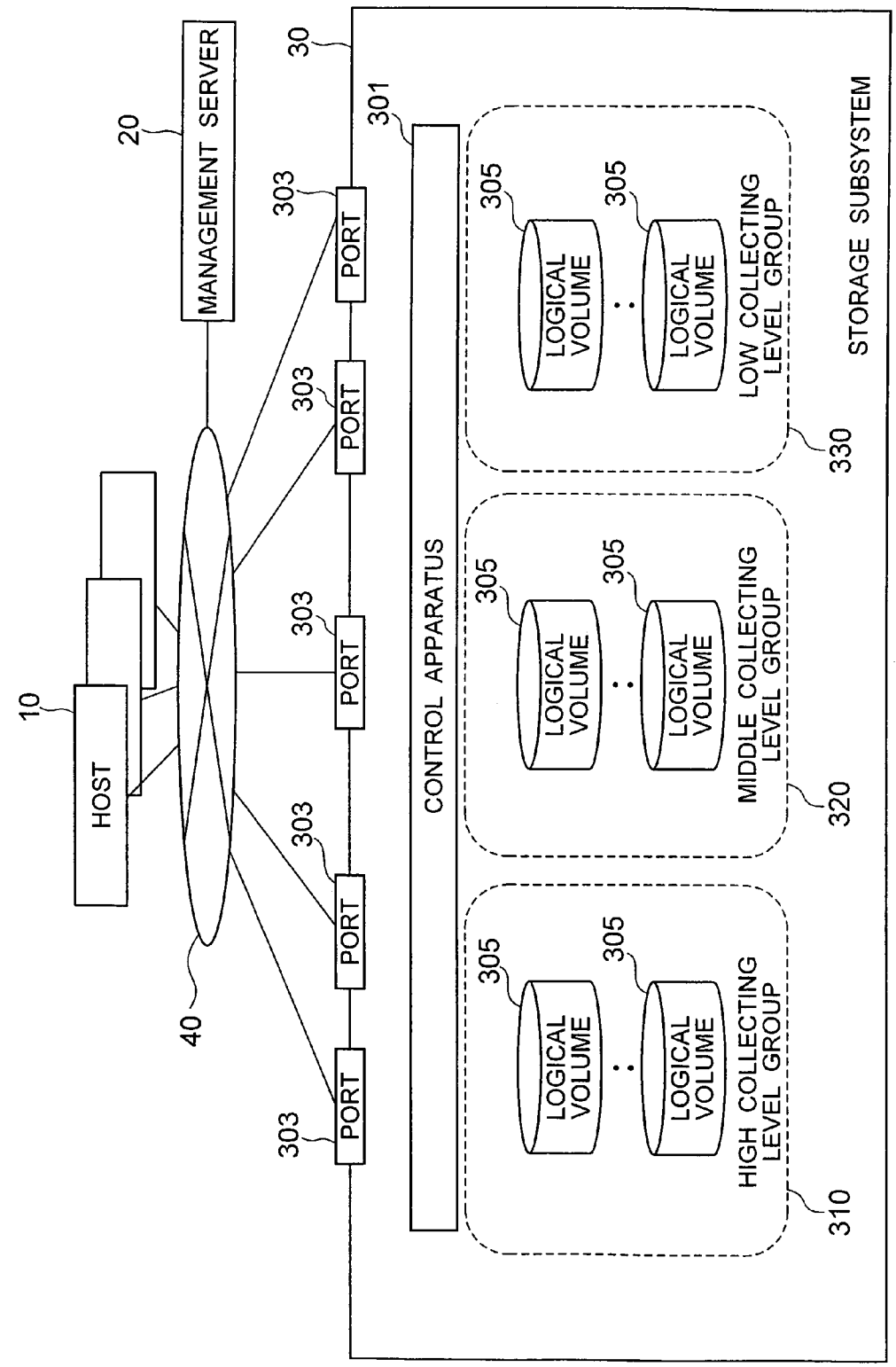
FIG. 1 is a block diagram showing a construction of a computer system according to the first embodiment of the invention.

FIG. 1 is a block diagram showing a construction of a computer system according to the first embodiment of the invention.

The computer system includes host computers 10, a storage subsystem 30, a management server 20, and an SAN 40.

The SAN 40 is a network which connects the storage subsystem 30 and the host computers 10. Further, the SAN 40 connects the storage subsystem 30 and the management server 20. The management server 20 and the storage subsystem 30 may be connected by an LAN (Local Area Network).

Each of the host computers 10 has a processor, a memory, and an interface. The processor provided for the host computer 10 executes various processes by executing programs stored in the memory. The memory provided for the host computer 10 stores the programs which are executed by the processor and the data and the like which are necessary for the processor. An interface provided for the host computer 10 is connected to the storage subsystem 30 through the SAN 40.

The host computer 10 writes the data into the storage subsystem 30. The host computer 10 reads out the data from the storage subsystem 30.

The storage subsystem 30 has a control apparatus 301, ports 303, and physical disks. The physical disk stores the data whose writing has been required by the host computer 10. The ports 303 are connected to the host computer 10 through the SAN 40.

The control apparatus 301 controls the writing/reading operations of the data to/from the physical disk. The control apparatus 301 provides storage areas of the physical disks as one or more logical volumes 305 to the host computer 10.

In the embodiment, the logical volumes 305 are classified into one of a high collecting level group 310, a middle collecting level group 320, and a low collecting level group 330. Although the logical volumes 305 have been classified into any one of the three collecting level groups, they may be classified into any one of an arbitrary number of collecting level groups.

The management server 20 is a computer for monitoring the storage subsystem 30. For example, the management server 20 obtains the performance information of the storage subsystem 30 and summarizes the obtained performance information. The performance information includes a collection item name showing the kind of performance information, a collecting time as a time when the performance information has been collected, and a performance value showing the performance of the kind corresponding to the collection item name.

The management server 20 monitors at a high precision the logical volumes 305 classified into the high collecting level group 310. That is, in the logical volumes 305 classified into the high collecting level group 310, a collecting interval of the performance information is short. In the logical volumes 305 classified into the high collecting level group 310, the number of kinds of collected performance information is large. Further, in the logical volumes 305 classified into the high collecting level group 310, the number of summarized information which is calculated is large.

The management server 20 monitors the logical volumes 305 classified into the low collecting level group 330 at a low precision. That is, in the logical volumes 305 classified into the low collecting level group 330, the collecting interval of the performance information is long. In the logical volumes 305 classified into the low collecting level group 330, the number of kinds of collected performance information is small. Further, in the logical volumes 305 classified into the low collecting level group 330, the number of summarized information which is calculated is small.

The management server will be described in detail with reference to FIG. 2.

Figure 2:
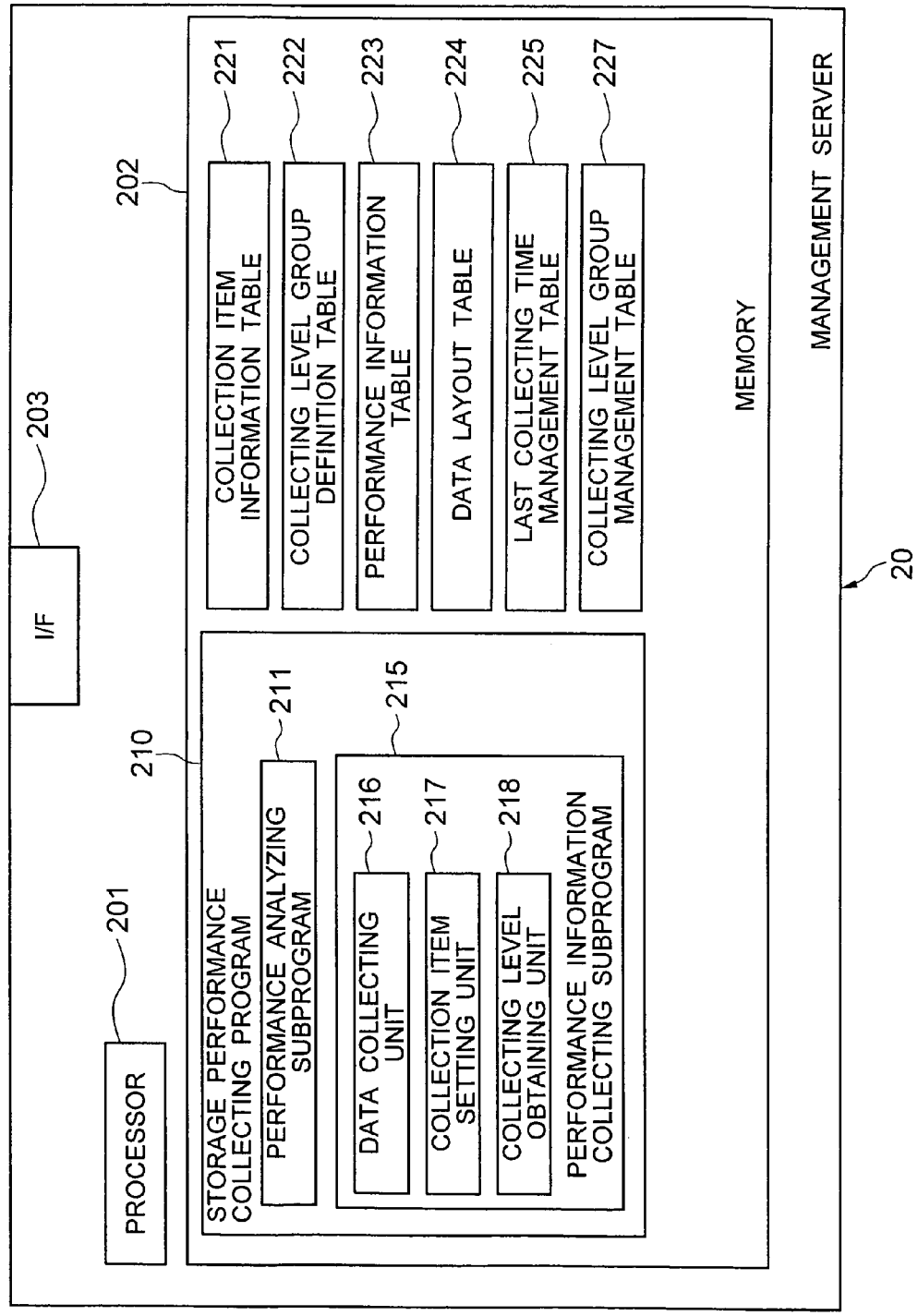
FIG. 2 is a block diagram showing a construction of a management server provided for the computer system in the first embodiment of the invention.

FIG. 2 is a block diagram showing a construction of the management server 20 provided for the computer system in the first embodiment of the invention.

The management server 20 has a processor 201, a memory 202, and an interface 203. The interface 203 is connected to the storage subsystem 30 through the SAN 40. The processor 201 executes various processes by executing programs which are stored in the memory 202.

The memory 202 stores the programs which are executed by the processor 201 and information and the like which are necessary for the processor 201.

Specifically speaking, the memory 202 includes: a storage performance collecting program 210, a collection item information table 221, a collecting level group definition table 222, a performance information table 223, a data layout table 224, a last collecting time management table 225, and a collecting level group management table 227.

The storage performance collecting program 210 monitors the performance of the storage subsystem 30. Specifically speaking, the storage performance collecting program 210 collects the performance information of the logical volumes 305 provided for the storage subsystem 30 from the storage subsystem 30 and analyzes the collected performance information. The storage performance collecting program 210 includes a performance analyzing subprogram 211 and a performance information collecting subprogram 215.

The performance information collecting subprogram 215 includes a data collecting unit 216, a collection item setting unit 217, and a collecting level obtaining unit 218.

The data collecting unit 216 collects the performance information of the logical volumes 305 provided for the storage subsystem 30 from the storage subsystem 30 with reference to the collection item information table 221. The data collecting unit 216 summarizes the collected performance information with reference to the summarizing conditions included in the collection item information table 221.

The collection item setting unit 217 forms or updates the collection item information table 221 with reference to the collecting level group definition table 222.

The collecting level obtaining unit 218 specifies the collecting level group to which the logical volumes 305 belong with reference to the collecting level group management table 227.

The collection item information table 221 manages the items, the collecting interval, and the like of the performance information which are collected from the logical volume 305. The collection item information table 221 also manages the conditions in which the performance information collected from the logical volume 305 is summarized. The collection item information table 221 will be described in detail with reference to FIG. 3.

The collecting level group definition table 222 manages definitions regarding the high collecting level group 310, the middle collecting level group 320, and the low collecting level group 330. Information has previously been stored in the collecting level group definition table 222 by an administrator or the like. The collecting level group definition table 222 will be described in detail with reference to FIG. 4.

The performance information table 223 manages the performance information collected from the logical volume 305. The performance information table 223 will be described in detail with reference to FIG. 5.

The data layout table 224 manages the correspondence between the logical volume 305 and the data stored in the logical volume 305. The data layout table 224 will be described in detail with reference to FIG. 6.

The last collecting time management table 225 manages the time when the performance information has finally been collected from the logical volume 305. The last collecting time management table 225 will be described in detail with reference to FIG. 7.

The collecting level group management table 227 manages the correspondence between the logical volume 305 and the collecting level group to which the logical volume 305 belongs. In the embodiment, the logical volumes 305 have previously been classified into one of the high collecting level group 310, the middle collecting level group 320, and the low collecting level group 330. Therefore, information has previously been stored in the collecting level group management table 227. The collecting level group management table 227 will be described in detail with reference to FIG. 8.

FIG. 3 is a constructional diagram of the collection item information table 221 which is stored in the management server 20 in the first embodiment of the invention.

The collection item information table 221 includes a logical volume number 2211, a collection item name 2212, a collecting interval 2213, summarizing conditions 2214, and a collecting level group 2215.

The logical volume number 2211 is a unique identifier of the logical volume 305 which is provided by the storage subsystem 30. The collection item name 2212 shows the kind of performance information which is collected from the logical volume 305 identified by the logical volume number 2211 of the relevant record.

The collecting interval 2213 is an interval at which the performance information corresponding to the collection item name 2212 of the relevant record is collected from the logical volume 305 identified by the logical volume number 2211 of the relevant record.

The summarizing conditions 2214 are conditions in which the performance information collected from the logical volume 305 identified by the logical volume number 2211 of the relevant record is summarized. For example, "hour", "day", "week", "month", or "year" is stored in the summarizing conditions 2214. A combination of two or more of "hour", "day", "week", "month", and "year" may be stored in the summarizing conditions 2214.

If "hour" has been stored in the summarizing conditions 2214, the management server 20 summarizes the collected performance information on an hour unit basis. If "day" has been stored in the summarizing conditions 2214, the management server 20 summarizes the collected performance information on a day unit basis. If "week" has been stored in the summarizing conditions 2214, the management server 20 summarizes the collected performance information on a week unit basis. If "month" has been stored in the summarizing conditions 2214, the management server 20 summarizes the collected performance information on a month unit basis. If "year" has been stored in the summarizing conditions 2214, the management server 20 summarizes the collected performance information on a year unit basis.

Conditions other than the time may be stored in the summarizing conditions 2214. That is, an arbitrary condition may be stored in the summarizing conditions 2214 so long as it is a condition in which the performance information is summarized.

The collecting level group 2215 shows to which one of the high collecting level group 310, the middle collecting level group 320, and the low collecting level group 330, the logical volume 305 identified by the logical volume number 2211 of the relevant record belongs.

FIG. 4 is a constructional diagram of the collecting level group definition table 222 which is stored in the management server 20 in the first embodiment of the invention.

The collecting level group definition table 222 includes a collecting level group 2221, a collection item name 2222, a collecting interval 2223 in the normal state, a collecting interval 2224 in the state of the increase in collecting costs, summarizing conditions 2225 in the normal state, summarizing conditions 2226 in the state of the increase in collecting costs, and a threshold value 2227.

The collecting level group 2221 shows the collecting level group into which the logical volumes 305 are classified. The collection item name 2222 shows the kind of performance information which is collected from the logical volume 305 belonging to the collecting level group which is identified by the collecting level group 2221 of the relevant record.

The collecting interval 2223 in the normal state is an interval at which the performance information corresponding to the collection item name 2222 of the relevant record is collected in the normal state from the logical volumes 305 belonging to the collecting level group identified by the collecting level group 2221 of the relevant record.

The collecting interval 2224 in the state of the increase in collecting costs is an interval at which the performance information corresponding to the collection item name 2222 of the relevant record is collected in the state of the increase in collecting costs from the logical volumes 305 belonging to the collecting level group identified by the collecting level group 2221 of the relevant record.

The summarizing conditions 2225 in the normal state are conditions in which the performance information collected in the normal state from the logical volumes 305 belonging to the collecting level group identified by the collecting level group 2221 of the relevant record is summarized in the normal state.

The summarizing conditions 2226 in the state of the increase in collecting costs are conditions in which the performance information collected from the logical volumes 305 belonging to the collecting level group identified by the collecting level group 2221 of the relevant record is summarized in the state of the increase in collecting costs.

The management server 20 discriminates to which one of the normal state and the state of the increase in collecting costs the collecting level group belongs on the basis of the performance information collected from the logical volume 305 or a load state or the like of the management server 20. For example, when a load to monitor the storage subsystem 30 is heavy, the management server 20 determines that the collecting level group corresponds to the state of the increase in collecting costs.

Although the management server 20 discriminates either the normal state or the state of the increase in collecting costs in the embodiment, it is also possible to discriminate to which one of the three or more states the collecting level group corresponds. In this case, the collecting interval and the summarizing conditions corresponding to each state are included in the collecting level group definition table 222.

The threshold value 2227 is a threshold value to display a warning regarding the logical volumes 305 belonging to the collecting level group identified by the collecting level group 2221 of the relevant record. That is, when the performance value collected from the logical volume 305 is larger than the threshold value 2227, the management server 20 generates the warning.

FIG. 5 is a constructional diagram of the performance information table 223 which is stored in the management server 20 in the first embodiment of the invention.

The performance information table 223 includes a logical volume number 2231, a collection item name 2232, a collecting time 2233, and a performance value 2234.

The logical volume number 2231 is a unique identifier of the logical volume 305 which is provided by the storage subsystem 30. The collection item name 2232 shows the kind of performance information which is collected from the logical volume 305 which is identified by the logical volume number 2231 of the relevant record.

The collecting time 2233 is time when the performance information has been collected from the logical volume 305 which is identified by the logical volume number 2231 of the relevant record. The performance value 2234 is a performance value collected from the logical volume 305 which is identified by the logical volume number 2231 of the relevant record at the collecting time 2233 of the relevant record. The performance value 2234 is a value showing the performance corresponding to the collection item name 2232 of the relevant record.

FIG. 6 is a constructional diagram of the data layout table 224 which is stored in the management server 20 in the first embodiment of the invention.

The data layout table 224 includes a data number 2241, a logical volume number 2242, and a layout period 2243.

The data number 2241 is a unique identifier of the data stored in the logical volume 305. The logical volume number 2242 is a unique identifier of the logical volume 305 in which the data identified by the data number 2241 is stored.

The layout period 2243 is a period of time during which the data identified by the data number 2241 is stored in the logical volume identified by the logical volume number 2242 of the relevant record.

When the data is moved between the logical volumes 305, the management server 20 updates the data layout table 224.

Specifically speaking, the management server 20 selects, from the data layout table 224, the records with which the identifier of the moved data and the data number 2241 in the data layout table 224 coincide. Subsequently, the management server 20 selects, from the selected records, the records with which the identifier of the logical volume 305 as a moving source of the data and the logical volume number 2242 in the data layout table 224 coincide. Subsequently, the management server 20 stores the present time as layout end time into the layout period 2243 of each of the selected records.

The management server 20 forms a new record into the data layout table 224. The management server 20 stores the identifier of the moved data into the data number 2241 of the new record. Subsequently, the management server 20 stores the identifier of the logical volume 305 as a movement destination of the data into the logical volume number 2242 of the new record. Further, the management server 20 stores the present time as layout start time into the layout period 2243 of the new record.

As mentioned above, the management server 20 updates the data layout table 224.

FIG. 7 is a constructional diagram of the last collecting time management table 225 which is stored in the management server 20 in the first embodiment of the invention.

The last collecting time management table 225 includes a logical volume number 2251, a collection item name 2252, and last collecting time 2253.

The logical volume number 2251 is a unique identifier of the logical volume 305 which is provided by the storage subsystem 30. The collection item name 2252 shows the kind of performance information which is collected from the logical volume 305 identified by the logical volume number 2251.

The last collecting time 2253 is time when the performance information corresponding to the collection item name 2252 of the relevant record has finally been collected from the logical volume 305 identified by the logical volume number 2251 of the relevant record.

FIG. 8 is a constructional diagram of the collecting level group management table 227 which is stored in the management server 20 in the first embodiment of the invention.

The collecting level group management table 227 includes a logical volume number 2271 and a collecting level group 2272.

The logical volume number 2271 is a unique identifier of the logical volume 305 which is provided by the storage subsystem 30.

The collecting level group 2272 shows the collecting level group to which the logical volume 305 identified by the logical volume number 2271 of the relevant record belongs. That is, the collecting level group 2272 shows to which one of the high collecting level group, the middle collecting level group, and the low collecting level group, the relevant logical volume 305 belongs.

Figure 9:
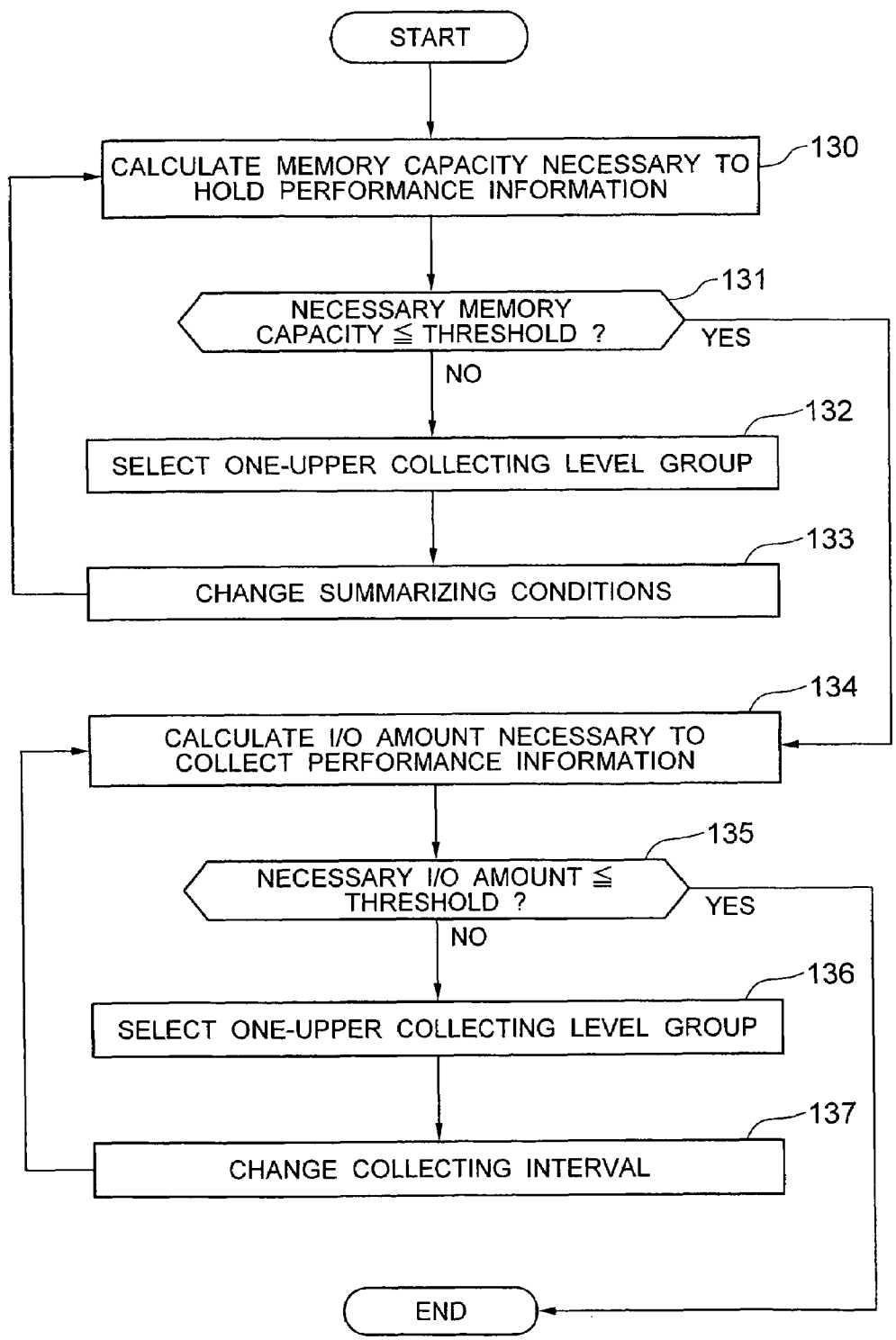
FIG. 9 is a flowchart for an updating process of a collection item information table which is executed by the management server in the first embodiment of the invention.

FIG. 9 is a flowchart for the updating process of the collection item information table 221 which is executed by the management server 20 in the first embodiment of the invention.

When the collecting level group to which the logical volume 305 belongs is changed, the management server 20 updates the collecting level group management table 227. Further, the management server 20 executes the updating process of the collection item information table 221.

First, the management server 20 counts the number of data-stored logical volumes 305 every collecting level group. Subsequently, on the basis of the counted number of logical volumes 305 and the collection item information table 221, the management server 20 calculates a memory capacity necessary to hold the performance information (Step 130).

The management server 20 compares the calculated memory capacity with a threshold value regarding the memory 202 in the management server 20. The threshold value regarding the memory 202 in the management server 20 is the maximum value of the memory capacity which can be used to hold the performance information. The threshold value is preset by the administrator. The management server 20 may compare the threshold value with one of I/O response time, the number of I/O times, an I/O frequency, and a disk occupation ratio instead of the memory capacity necessary to hold the performance information. By such a method, the management server 20 can discriminate which one of the normal state and the state of the increase in collecting costs the collecting level group belongs to on the basis of the I/O response time, the number of I/O times, the I/O frequency, or the disk occupation ratio.

The management server 20 discriminates whether or not the calculated memory capacity is equal to or less than the threshold value (Step 131). If the calculated memory capacity is larger than the threshold value, the management server 20 cannot hold all of the performance information because the memory capacity of the memory 202 is insufficient. Therefore, the management server 20 changes the summarizing conditions.

Specifically speaking, the management server 20 selects the collecting level group whose collecting level is higher than the collecting level group selected in Step 132 at the preceding time by one level (Step 132). In the case of executing the process of Step 132 for the first time, the management server 20 selects the low collecting level group 330 corresponding to the lowest collecting level.

Subsequently, the management server 20 changes the summarizing conditions of the collecting level group selected in Step 132 from the summarizing conditions in the normal state to the summarizing conditions in the state of the increase in collecting costs (Step 133).

Specifically speaking, the management server 20 selects, from the collecting level group definition table 222, the records with which the collecting level group selected in Step 132 and the collecting level group 2221 in the collecting level group definition table 222 coincide. The management server 20 extracts, from each of the selected records, the collection item name 2222 and the summarizing conditions 2226 in the state of the increase in collecting costs.

Subsequently, the management server 20 selects, from each of the collection item information table 221, the records with which the collecting level group selected in step 132 and the collecting level group 2215 in the collection item information table 221 coincide. The management server 20 selects, from the selected records, the records with which the extracted collection item name 2222 and the collection item name 2212 in the collection item information table 221 coincide. Subsequently, the management server 20 stores the extracted summarizing conditions 2226 in the state of the increase in collecting costs into the summarizing conditions 2214 of each of the selected records. The management server 20 returns to Step 130 and repeats the processes.

If the memory capacity necessary to hold the performance information is equal to or less than the threshold value in Step 131, the management server 20 does not need to change the summarizing conditions. Therefore, the management server 20 counts the number of data-stored logical volumes 305 every collecting level group. Subsequently, the management server 20 calculates the number of I/O times per unit time necessary to collect the performance information on the basis of the counted number of logical volumes 305 and the collecting interval 2213 in the collection item information table 221 (Step 134).

After that, the management server 20 compares the calculated number of I/O times with a threshold value regarding the number of I/O times. The threshold value regarding the number of I/O times is the maximum value of the number of I/O times per unit time which can be transmitted by the management server 20 in order to collect the performance information. The threshold value is preset by the administrator. The management server 20 may compare the threshold value with one of the memory capacity necessary to hold the performance information, I/O response time, I/O frequency, and disk occupation ratio instead of the number of I/O times per unit time necessary to hold the performance information. By such a method, the management server 20 can discriminate to which one of the normal state and the state of the increase in collecting costs the collecting level group belongs on the basis of the memory capacity necessary to hold the performance information, the I/O response time, the I/O frequency, or the disk occupation ratio.

The management server 20 discriminates whether or not the calculated number of I/O times is equal to or less than the threshold value (Step 135). If the calculated number of I/O times is larger than the threshold value, the management server 20 cannot collect all of the performance information. Therefore, the management server 20 changes the collecting interval.

Specifically speaking, the management server 20 selects the collecting level group whose collecting level is higher than the collecting level group selected in Step 136 at the preceding time by one level (Step 136). In the case of executing the process of Step 136 for the first time, the management server 20 selects the low collecting level group corresponding to the lowest collecting level.

Subsequently, the management server 20 changes the collecting interval of the collecting level group selected in Step 136 from the collecting interval in the normal state to the collecting interval in the state of the increase in collecting costs (Step 137).

Specifically speaking, the management server 20 selects, from the collecting level group definition table 222, the records with which the collecting level group selected in Step 136 and the collecting level group 2221 in the collecting level group definition table 222 coincide. The management server 20 extracts, from each of the selected records, the collection item name 2222 and the collecting interval 2224 in the state of the increase in collecting costs.

Subsequently, the management server 20 selects, from the collection item information table 221, the records with which the collecting level group selected in Step 136 and the collecting level group 2215 in the collection item information table 221 coincide. The management server 20 selects, from each of the selected records, the records in which the extracted collection item name 2222 and the collection item name 2212 in the collection item information table 221 coincide. Subsequently, the management server 20 stores the extracted collecting interval 2224 in the state of the increase in collecting costs into the collecting interval 2213 of each of the selected records. The management server 20 returns to Step 134 and repeats the processes.

If the calculated number of I/O times is equal to or less than the threshold value in Step 135, the management server 20 does not need to change the collecting interval. Therefore, the management server 20 finishes the updating process of the collection item information table 221.

As mentioned above, the management server 20 updates the collection item information table 221. The management server 20 collects the performance information on the basis of the collection item information table 221. Further, the management server 20 summarizes the collected performance information on the basis of the collection item information table 221. Therefore, the management server 20 can change the collecting conditions of the performance information and the summarizing conditions of the collected performance information in accordance with the performance monitoring load of the management server 20. The performance monitoring load includes a load for collecting the performance information and a load for summarizing the performance information. The collecting conditions of the performance information include the interval at which the performance information is collected and the item of the performance information which is collected.

When the performance monitoring load decreases, the management server 20 returns the collecting interval of the collecting level groups from the collecting interval in the state of the increase in collecting cost to the collecting interval in the normal state. At this time, it is preferable that the management server 20 returns the collecting interval of the collecting level groups from the collecting interval in the state of the increase in collecting cost to the collecting interval in the normal state in order from the higher collecting level.

Similarly, when the performance monitoring load decreases, the management server 20 returns the summarizing conditions of the collecting level groups from the summarizing conditions in the state of the increase in collecting cost to the summarizing conditions in the normal state. At this time, it is preferable that the management server 20 returns the summarizing conditions of the collecting level groups from the summarizing conditions in the state of the increase in collecting cost to the summarizing conditions in the normal state in order from the higher collecting level.

Figure 10:
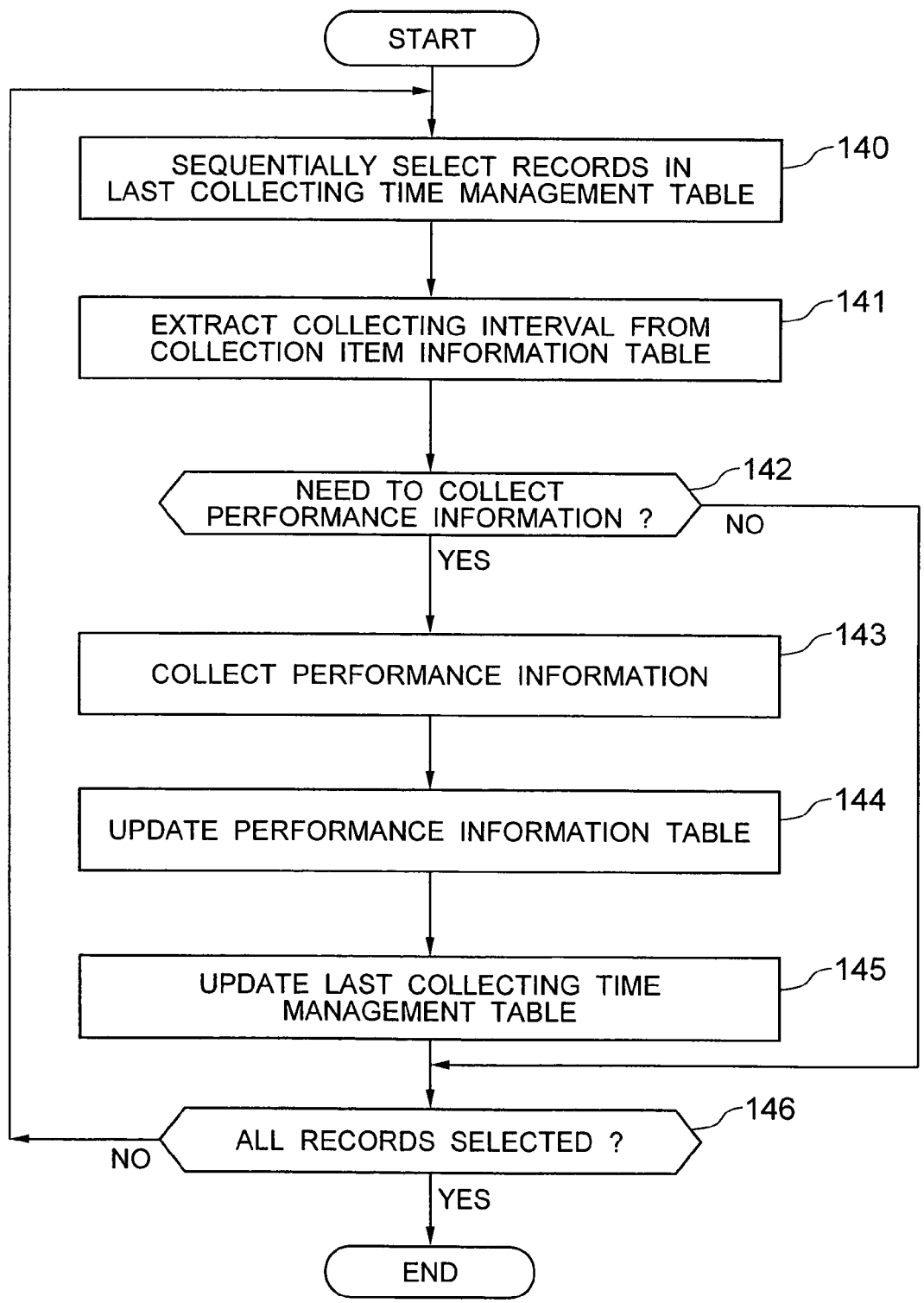
FIG. 10 is a flowchart for a performance information collecting process which is executed by the management server in the first embodiment of the invention.

FIG. 10 is a flowchart for a performance information collecting process which is executed by the management server 20 in the first embodiment of the invention.

The management server 20 collects the performance information by repeating the performance information collecting process every predetermined time.

First, the management server 20 sequentially selects one record in the last collecting time management table 225 from the top (Step 140). The management server 20 extracts, from each of the selected records, the logical volume number 2251, the collection item name 2252, and the last collecting time 2253.

Subsequently, the management server 20 selects, from the collection item information table 221, the records with which the extracted logical volume number 2251 and the logical volume number 2211 in the collection item information table 221 coincide. The management server 20 selects, from each of the selected records, the records with which the extracted collection item name 2252 and the collection item name 2212 in the collection item information table 221 coincide. The management server 20 extracts the collecting interval 2213 from each of the selected records (Step 141).

Subsequently, the management server 20 calculates the next collecting time by adding the extracted collecting interval 2213 to the extracted last collecting time 2253. The management server 20 compares the calculated collecting time of the next time with the present time, thereby discriminating whether or not it is necessary to collect the performance information from the logical volume 305 which is identified by the extracted logical volume number 2251 (Step 142).

Specifically speaking, if the calculated next collecting time is after the present time, the management server 20 determines that there is no need to collect the performance information, so that the management server 20 advances to Step 146. The management server 20 discriminates whether or not all of the records in the last collecting time management table 225 have been selected in Step 140 (Step 146). If all of the records are not selected, the management server 20 returns to Step 140 and selects the next record from the last collecting time management table 225. The management server 20 repeats the performance information collecting process to the selected record.

If all of the records have been selected, the management server 20 finishes the performance information collecting process.

If it is determined in Step 142 that the calculated next collecting time is before the present time, the management server 20 determines that it is necessary to collect the performance information. Thus, the management server 20 collects the performance information of the logical volume 305 identified by the extracted logical volume number 2251 from the storage subsystem 30 (Step 143).

Subsequently, the management server 20 updates the performance information table 223 (Step 144). Specifically speaking, the management server 20 adds the new record into the performance information table 223. The management server 20 stores the extracted logical volume number 2251 into the logical volume number 2231 of the new record. The management server 20 stores the extracted collection item name 2252 into the collection item name 2232 of the new record. The management server 20 stores the present time into the collecting time 2233 of the new record. Further, the management server 20 stores the collected performance information into the performance value 2234 of the new record.

Subsequently, the management server 20 updates the last collecting time management table 225 (Step 145). Specifically speaking, the management server 20 stores the present time into the collecting time 2233 of the record selected from the last collecting time management table 225 in Step 140.

The management server 20 discriminates whether or not all of the records in the last collecting time management table 225 have been selected in Step 140 (Step 146). If all of the records are not selected, the management server 20 returns to Step 140 and selects the next record from the last collecting time management table 225. The management server 20 repeats the performance information collecting process to the selected record.

If all of the records have been selected, the management server 20 finishes the performance information collecting process.

Figure 11:
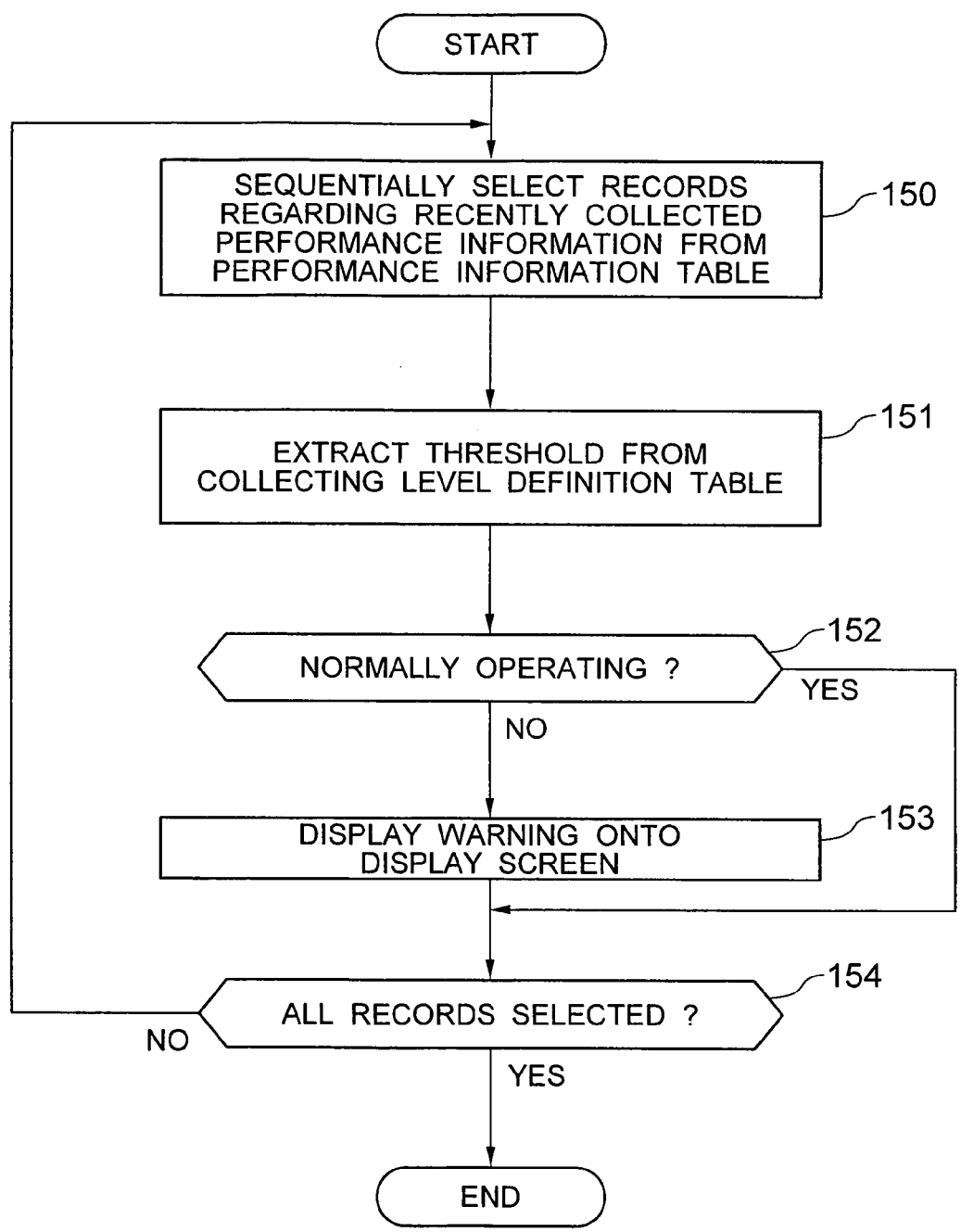
FIG. 11 is a flowchart for a performance analyzing process which is executed by the management server in the first embodiment of the invention.

FIG. 11 is a flowchart for a performance analyzing process which is executed by the management server 20 in the first embodiment of the invention.

First, the management server 20 selects, in order from the performance information table 223, the records in which a difference between the collecting time 2233 in the performance information table 223 and the present time is within a predetermined time. Thus, the management server 20 selects, in order from the performance information table 223, the records regarding the performance information which has been collected only recently (Step 150). The management server 20 extracts, from each of the selected records, the logical volume number 2231, the collection item name 2232, and the performance value 2234.

Subsequently, the management server 20 selects, from the collecting level group management table 227, the records with which the extracted logical volume number 2231 and the logical volume number 2271 in the collecting level group management table 227 coincide. The management server 20 extracts the collecting level group 2272 from each of the selected records.

Subsequently, the management server 20 selects, from the collecting level group definition table 222, the records with which the extracted collecting level group 2272 and the collecting level group 2221 in the collecting level group definition table 222 coincide. The management server 20 selects, from each of the selected records, the records with which the extracted collection item name 2232 and the collection item name 2222 in the collecting level group definition table 222 coincide. The management server 20 extracts the threshold value 2227 from each of the selected records (Step 151).

Subsequently, the management server 20 compares the extracted performance value 2234 with the extracted threshold value 2227, thereby discriminating whether or not the storage subsystem 30 is normally operating (Step 152).

If the storage subsystem 30 is normally operating, since it is unnecessary to display a warning on a display screen, the management server 20 directly advances to Step 154.

If the storage subsystem 30 is not normally operating, the management server 20 display the warning on the display screen (Step 153).

Subsequently, the management server 20 discriminates whether or not all of the records in which the collecting time 2233 in the performance information table 223 and the present time coincide have been selected from the performance information table 223 in Step 150 (Step 154). If all of the records are not selected, the management server 20 returns to Step 150 and selects the next record from the performance information table 223. The management server 20 repeats the performance analyzing process to the selected record.

If all of the records have been selected, the management server 20 finishes the performance analyzing process.

As mentioned above, according to the first embodiment of the invention, the management server 20 can change the collection item, the collecting interval, and the summarizing conditions of the performance information of the logical volumes 305 every collecting level group. Specifically speaking, if the correspondence between the logical volume and the collecting level group is changed, the management server 20 changes the collection item, the collecting interval, and the summarizing conditions of the performance information of the logical volumes 305 in accordance with the performance monitoring load or the like.

Second Embodiment

In the second embodiment of the invention, the management server 20 changes the correspondence between the logical volume 305 and the collecting level group on the basis of the performance information collected from the logical volume 305.

Since a construction of a computer system of the second embodiment is similar to that in the first embodiment except for the management server 20, explanation of component elements having substantially the same constructions as those in the first embodiment is omitted.

Figure 12:
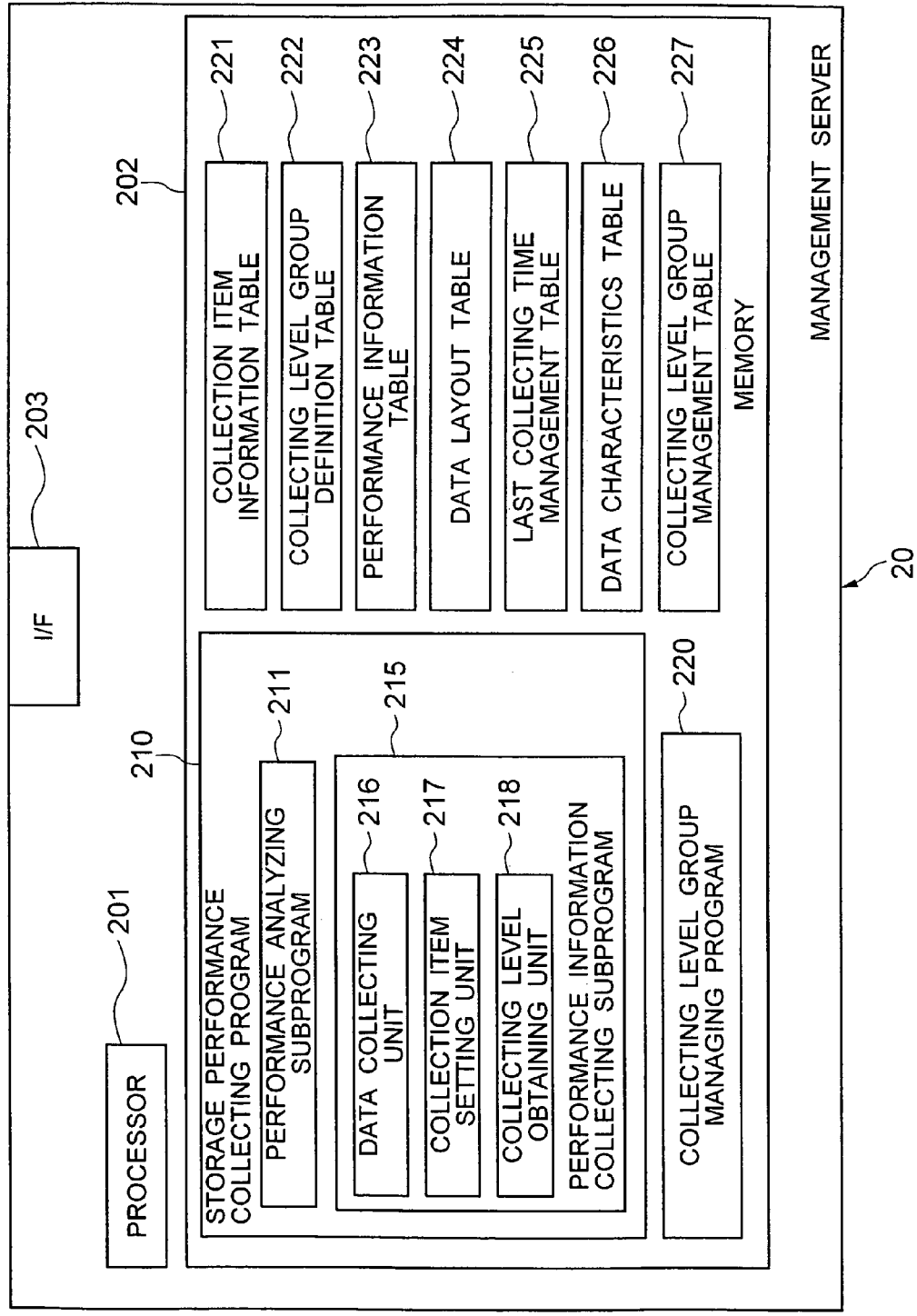
FIG. 12 is a block diagram showing a construction of a management server provided for a computer system in the second embodiment of the invention.

FIG. 12 is a block diagram showing a construction of the management server 20 provided for the computer system in the second embodiment of the invention.

The management server 20 in the second embodiment is substantially the same as the management server in the first embodiment except for a point that a collecting level group managing program 220 and a data characteristics table 226 are stored in the memory 202. Component elements having substantially the same constructions as those in the first embodiment are designated by the same reference numerals and their explanation is omitted.

The collecting level group managing program 220 classifies the logical volumes 305 into one of the high collecting level group 310, the middle collecting level group 320, and the low collecting level group 330 on the basis of the data characteristics table 226. The collecting level group managing program 220 changes the correspondence between the logical volume 305 and the collecting level group on the basis of the data characteristics table 226. Although the logical volumes 305 are classified into one of the three collecting level groups in the embodiment, they may be classified into one of an arbitrary number of collecting level groups.

The collecting level group managing program 220 may classify the ports provided for the storage subsystem 30 into one of the high collecting level group 310, the middle collecting level group 320, and the low collecting level group 330.

The collecting level group managing program 220 stores, into the collecting level group management table 227, the correspondence between the logical volume 305 and the collecting level group to which the logical volume 305 belong.

In the embodiment, the management server 20 stores the storage performance collecting program 210 and the collecting level group managing program 220. However, the storage performance collecting program 210 and the collecting level group managing program 220 may be executed by different servers.

The data characteristics table 226 manages the performance information of the data which is stored in the logical volumes 305. The data characteristics table 226 will be described in detail with reference to FIG. 13.

FIG. 13 is a constructional diagram of the data characteristics table 226 which is stored in the management server 20 in the second embodiment of the invention.

The data characteristics table 226 includes a data number 2261, a logical volume number 2262, and an access frequency 2263.

The data number 2261 is a unique identifier of the data stored in the logical volume 305. The logical volume number 2262 is a unique identifier of the logical volume 305 in which the data identified by the data number 2261 of the relevant record has been stored.

The access frequency 2263 denotes the number of I/O times per unit time for the data identified by the data number 2261 of the relevant record. The data characteristics table 226 may include the performance information other than the access frequency instead of the access frequency 2263.

Figure 14:
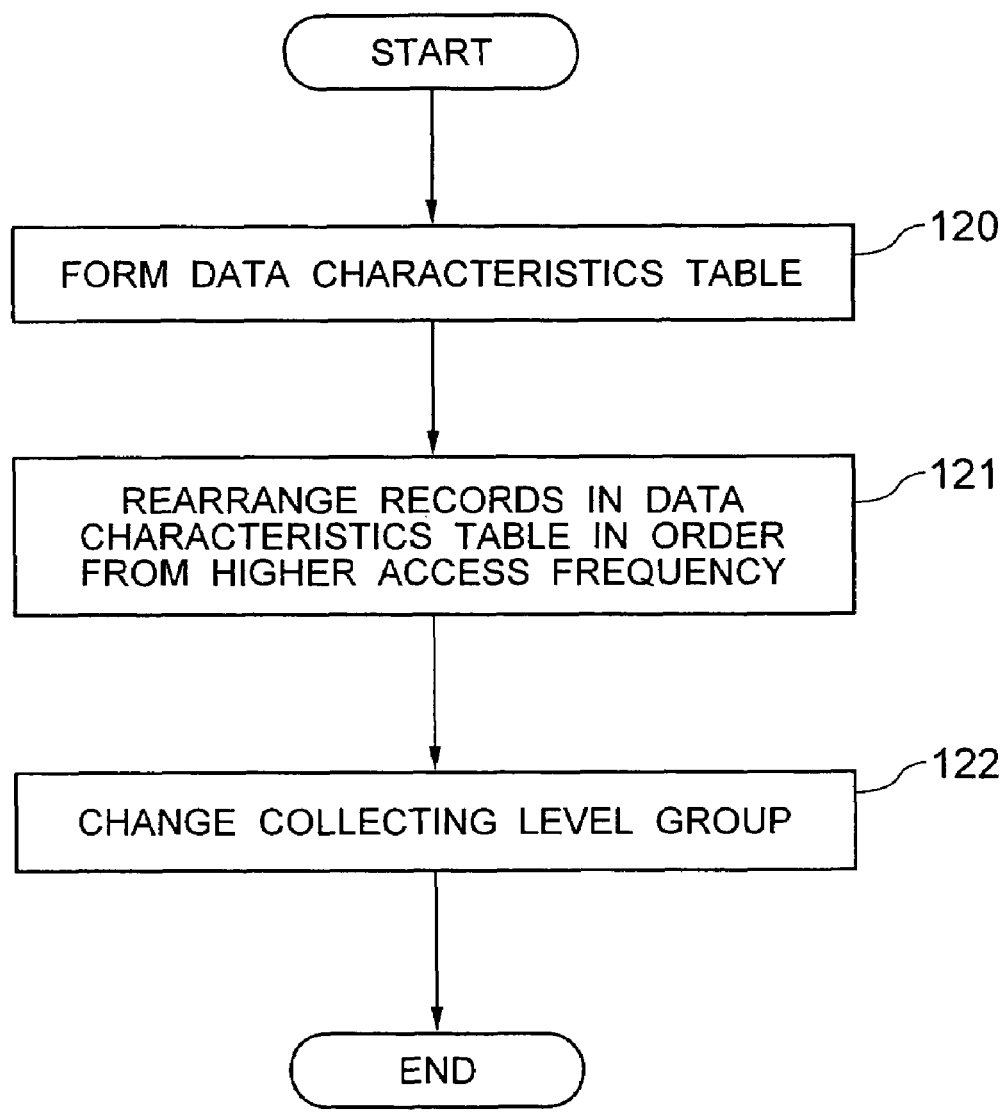
FIG. 14 is a flowchart for a collecting level group changing process which is executed by the management server in the second embodiment of the invention.

FIG. 14 is a flowchart for a collecting level group changing process which is executed by the management server 20 in the second embodiment of the invention.

First, the management server 20 forms the data characteristics table 226 on the basis of the performance information table 223 and the data layout table 224 (Step 120).

Specifically speaking, the management server 20 selects, from the data layout table 224, all of the records in which the layout period 2243 in the data layout table 224 includes the present time. The management server 20 extracts the data number 2241 and the logical volume number 2242 from each of the selected records.

Subsequently, the management server 20 selects, from the performance information table 223, all of the records with which the extracted logical volume number 2242 and the logical volume number 2231 in the performance information table 223 coincide. The management server 20 selects, from the selected records, the records in which the "number of I/O times" has been stored in the collection item name 2232 in the performance information table 223. The management server 20 selects, from the selected records, the records in which the latest time has been stored in the collecting time 2233 in the performance information table 223. The management server 20 extracts the performance value 2234 from each of the selected records.

Subsequently, the management server 20 stores the extracted data number 2241 into the data number 2261 in the data characteristics table 226. The management server 20 stores the extracted logical volume number 2242 into the logical volume number 2262 in the data characteristics table 226. The management server 20 stores the extracted performance value 2234 into the access frequency 2263 in the data characteristics table 226. In this manner, the management server 20 forms the data characteristics table 226.

Subsequently, the management server 20 rearranges the records in the data characteristics table 226 in order from the higher access frequency 2263 in the data characteristics table 226 (Step 121). The management server 20 updates the collecting level group management table 227.

Specifically speaking, the management server 20 selects a predetermined number of records in the data characteristics table 226 in order from the top. The management server 20 extracts the logical volume number 2262 from each of the predetermined number of records which have been selected first. The management server 20 selects, from the collecting level group management table 227, the records with which the extracted logical volume number 2262 and the logical volume number 2271 in the collecting level group management table 227 coincide. The management server 20 stores the "high collecting level group" into the collecting level group 2272 of each of the selected records. Thus, the management server 20 classifies the logical volumes 305 whose access frequency is high into the high collecting level group.

The management server 20 selects a predetermined number of non-selected records in the data characteristics table 226 in order from the top. The management server 20 extracts the logical volume number 2262 from the predetermined number of records which have been selected at the second time. The management server 20 selects, from the collecting level group management table 227, the records with which the extracted logical volume number 2262 and the logical volume number 2271 in the collecting level group management table 227 coincide. The management server 20 stores the "middle collecting level group" into the collecting level group 2272 of each of the selected records.

The management server 20 extracts the logical volume number 2262 from each of the non-selected records remaining in the data characteristics table 226. The management server 20 selects, from the collecting level group management table 227, the records with which the extracted logical volume number 2262 and the logical volume number 2271 in the collecting level group management table 227 coincide. The management server 20 stores the "low collecting level group" into the collecting level group 2272 of each of the selected records. Thus, the management server 20 classifies the logical volumes 305 whose access frequency is low into the low collecting level group.

Further, the management server 20 updates the collection item information table 221 on the basis of the collecting level group definition table 222 and the updated collecting level group management table 227.

Specifically speaking, the management server 20 specifies the logical volume 305 whose correspondence to the collecting level group has been changed. The management server 20 selects, from the collecting level group management table 227, the records with which the identifier of the specified logical volume 305 and the logical volume number 2271 in the collecting level group management table 227 coincide. The management server 20 extracts the collecting level group 2272 from each of the selected records.

Subsequently, the management server 20 discriminates which one of the normal state and the state of the increase in collecting costs the extracted collecting level group 2272 corresponds to.

If the collecting level group 2272 corresponds to the normal state, the management server 20 selects, from the collecting level group definition table 222, the records with which the extracted collecting level group 2272 and the collecting level group 2221 in the collecting level group definition table 222 coincide. The management server 20 extracts, from each of the selected records, the collecting interval 2223 in the normal state and the summarizing conditions 2225 in the normal state.

Subsequently, the management server 20 selects, from the collection item information table 221, the records with which the identifier of the specified logical volume 305 and the logical volume number 2211 in the collection item information table 221 coincide. The management server 20 stores the extracted collecting interval 2224 in the state of the increase in collecting costs into the collecting interval 2213 of each of the selected records. The management server 20 stores the extracted summarizing conditions 2226 in the state of the increase in collecting costs into the summarizing conditions 2214 of each of the selected records. Further, the management server 20 stores the extracted collecting level group 2272 into the collecting level group 2215 of each of the selected records.

If the collecting level group 2272 corresponds to the state of the increase in collecting costs, the management server 20 selects, from the collecting level group definition table 222, the records with which the extracted collecting level group 2272 and the collecting level group 2221 in the collecting level group definition table 222 coincide. The management server 20 extracts the collecting interval 2224 in the state of the increase in collecting costs and the summarizing conditions 2226 in the state of the increase in collecting costs from each of the selected records.

Subsequently, the management server 20 selects, from the collection item information table 221, the records with which the identifier of the specified logical volume 305 and the logical volume number 2211 in the collection item information table 221 coincide. The management server 20 stores the extracted collecting interval 2224 in the state of the increase in collecting costs into the collecting interval 2213 of each of the selected records. The management server 20 stores the extracted summarizing conditions 2226 in the state of the increase in collecting costs into the summarizing conditions 2214 of each of the selected records. Further, the management server 20 stores the extracted collecting level group 2272 into the collecting level group 2215 of each of the selected records.

In this manner, the management server 20 changes the correspondence between the logical volume 305 and the collecting level group (Step 122). The management server 20 finishes the collecting level group changing process.

As mentioned above, in the second embodiment, the management server 20 changes the correspondence between the logical volume 305 and the collecting level group on the basis of the access frequency to the logical volume 305. The management server 20 may change the correspondence between the logical volume 305 and the collecting level group on the basis of another performance information of the logical volume 305 instead of the access frequency.

Third Embodiment

In the third embodiment, the management server 20 sets the collecting level group every storage subsystem 30.

Figure 15:
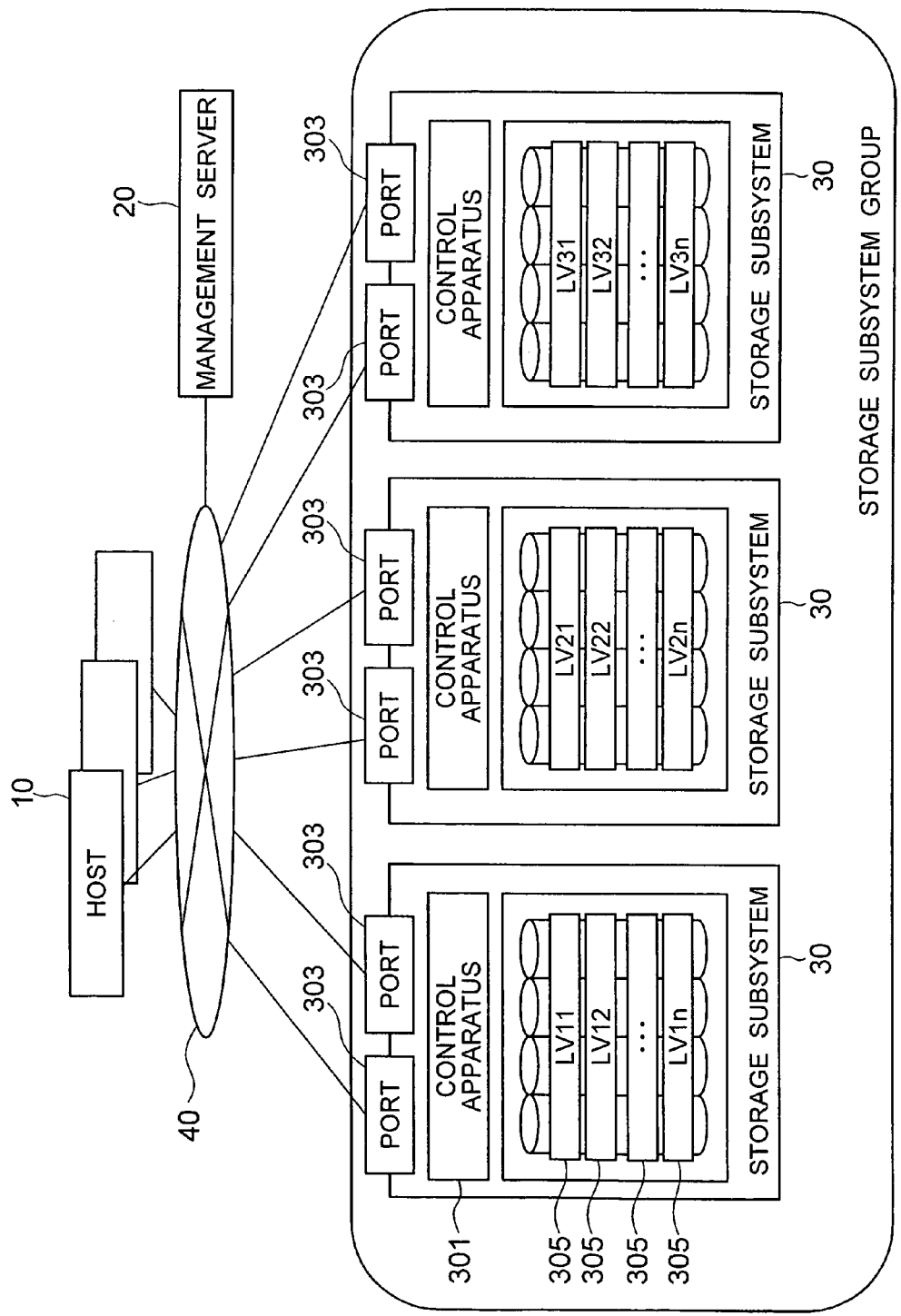
FIG. 15 is a block diagram showing a construction of a computer system according to the third embodiment of the invention.

FIG. 15 is a block diagram showing a construction of a computer system according to the third embodiment of the invention.

The computer system includes the host computers 10, a storage subsystem group, the management server 20, and the SAN 40.

Since the host computers 10 and the SAN 40 are substantially the same as those in the computer system in the first embodiment, their explanation is omitted.

The storage subsystem group includes a plurality of storage subsystems 30. Although the storage subsystem group includes three storage subsystems 30 in the embodiment, it may also include an arbitrary number of storage subsystems. The storage subsystems 30 included in the storage subsystem group may be also a virtual storage subsystem obtained by logically dividing one storage subsystem into a plurality of storage subsystems.

Each of the storage subsystems 30 has the control apparatus 301, ports 303, and physical disks. The physical disk stores the data whose writing has been required by the host computer 10. The ports 303 are connected to the host computer 10 through the SAN 40.

The control apparatus 301 controls the writing/reading operations of the data to/from the physical disk. The control apparatus 301 provides the storage areas of the physical disks as one or more logical volumes 305 to the host computer 10.

In the embodiment, the management server 20 classifies the logical volumes 305 into one of the high collecting level group, the middle collecting level group, and the low collecting level group on a unit basis of the storage subsystem 30. The management server 20 will be explained in detail with reference to FIG. 16.

The logical volumes 305 may have previously been classified into one of the high collecting level group, the middle collecting level group, and the low collecting level group on a unit basis of the storage subsystem 30. In this case, it is preferable that the logical volumes 305 which are provided by the storage subsystem of the high layer of the high performance are classified into the high collecting level group. It is also preferable that the logical volumes 305 which are provided by the storage subsystem of the low layer of the low performance are classified into the low collecting level group.

Figure 16:
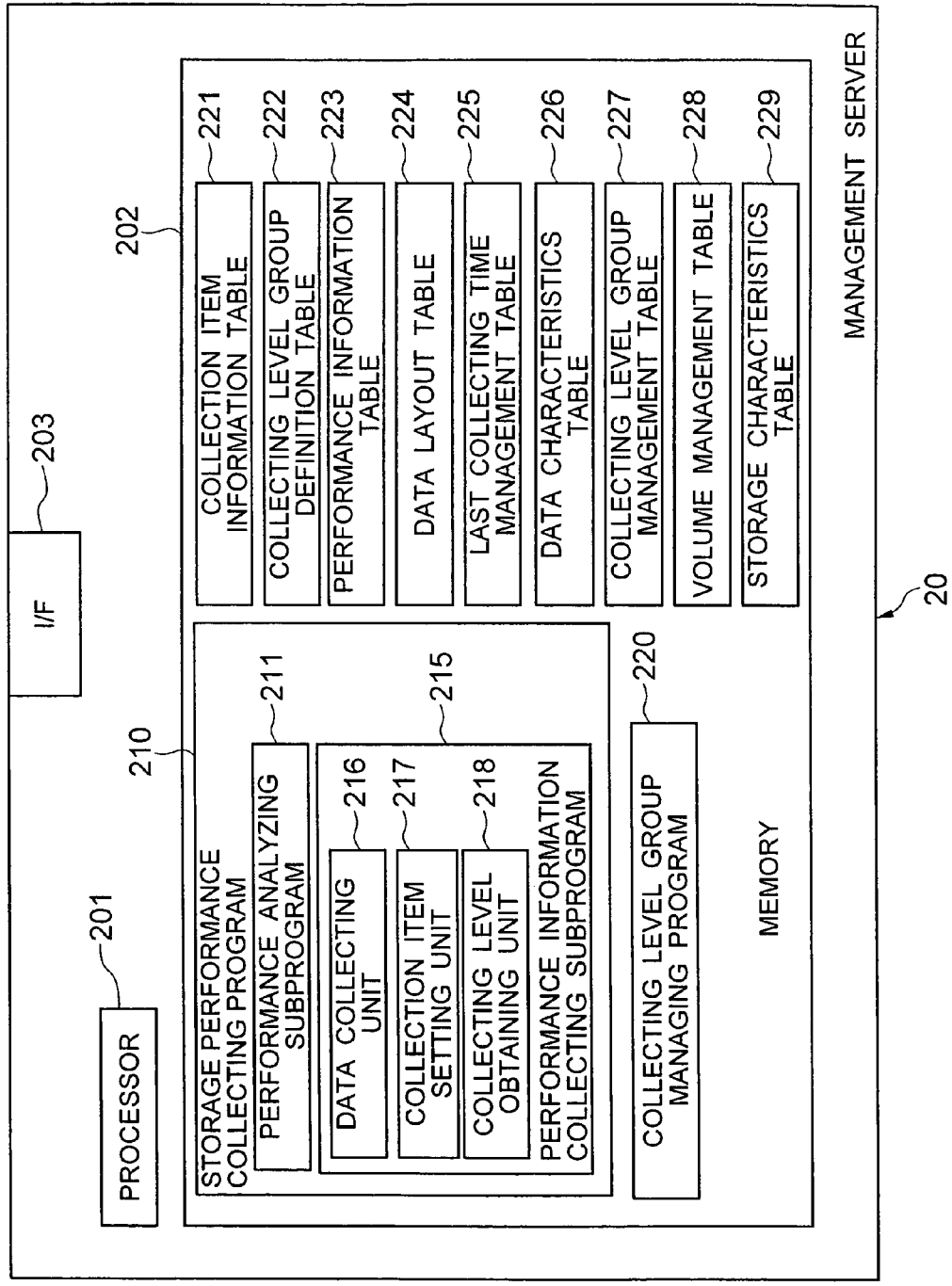
FIG. 16 is a block diagram showing a construction of a management server provided for the computer system in the third embodiment of the invention.

FIG. 16 is a block diagram showing a construction of the management server 20 provided for the computer system in the third embodiment of the invention.

The management server 20 in the third embodiment is substantially the same as the management server in the first embodiment except for a point that a volume management table 228 and a storage characteristics table 229 are stored in the memory 202. Component elements having substantially the same constructions as those in the first embodiment are designated by the same reference numerals and their explanation is omitted.

The volume management table 228 manages the correspondence between the logical volume 305 and the storage subsystem 30 which provides the logical volume 305. The volume management table 228 will be explained in detail with reference to FIG. 17.

The storage characteristics table 229 manages the characteristics of the data which is stored in the storage subsystem 30. The storage characteristics table 229 will be explained in detail with reference to FIG. 18.

FIG. 17 is a constructional diagram of the volume management table 228 which is stored in the management server 20 in the third embodiment of the invention.

The volume management table 228 includes a logical volume number 2281 and a storage number 2282.

The logical volume number 2281 is a unique identifier of the logical volume 305 which is provided by the storage subsystem 30. The storage number 2282 is a unique identifier of the storage subsystem 30 which provides the logical volume 305 identified by the logical volume number 2281 of the relevant record.

FIG. 18 is a constructional diagram of the storage characteristics table 229 which is stored in the management server 20 in the third embodiment of the invention.

The storage characteristics table 229 includes a storage number 2291 and an access frequency 2292.

The storage number 2291 is a unique identifier of the storage subsystem 30 provided for the computer system. The access frequency 2292 is the number of I/O times per unit time for the data stored in the storage subsystem 30 identified by the storage number 2291 of the relevant record. The storage characteristics table 229 may include performance information other than the access frequency instead of the access frequency 2292.

Figure 19:
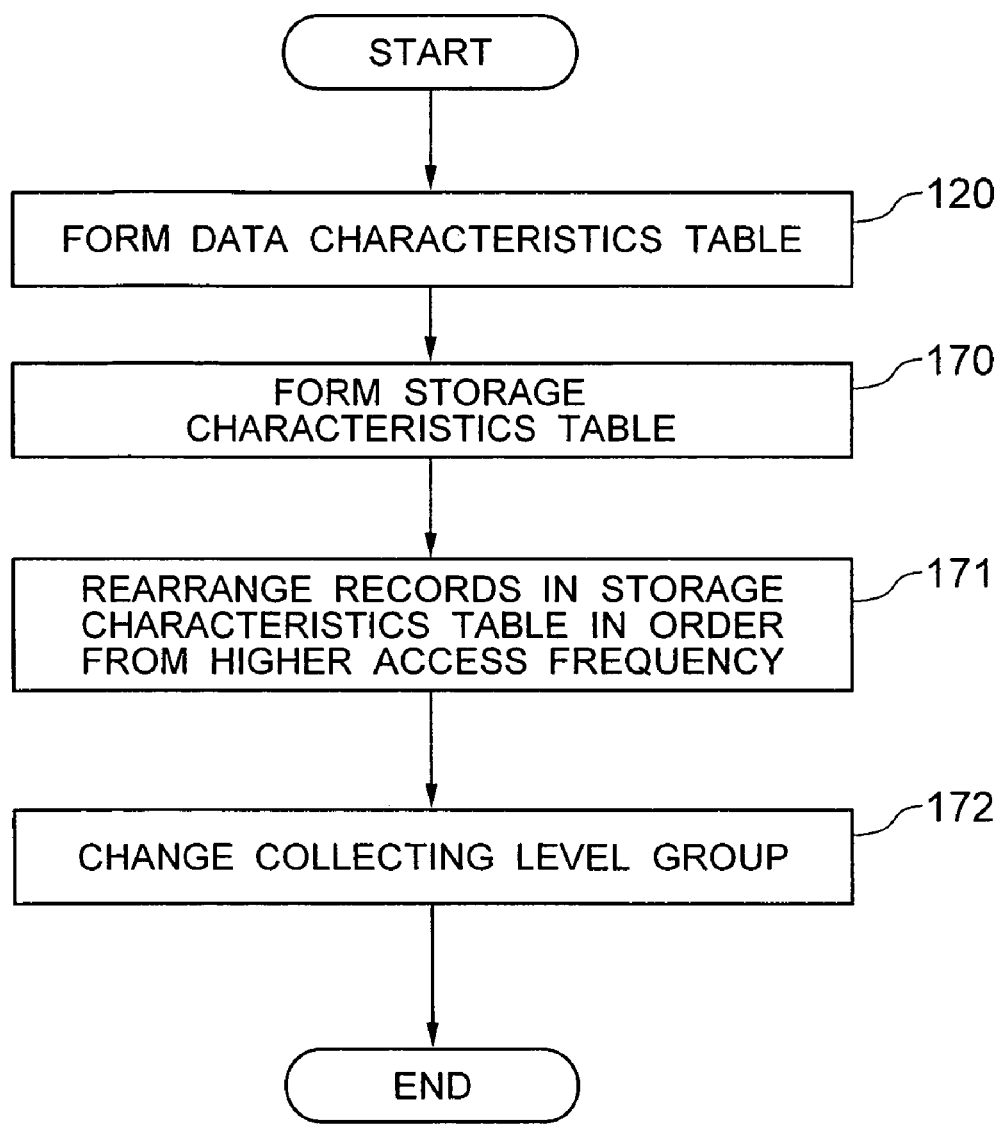
FIG. 19 is a flowchart for a collecting level group changing process which is executed by the management server in the third embodiment of the invention.

FIG. 19 is a flowchart for a collecting level group changing process executed by the management server 20 in the third embodiment of the invention.

First, the management server 20 forms the data characteristics table 226 on the basis of the performance information table 223 and the data layout table 224 (Step 120). Since Step 120 is the same as that included in the collecting level group changing process (FIG. 14) in the second embodiment, its detailed explanation is omitted here.

Subsequently, the management server 20 forms the storage characteristics table 229 on the basis of the volume management table 228 and the formed data characteristics table 226 (Step 170).

Specifically speaking, the management server 20 sequentially selects the storage subsystems 30 provided for the computer system. The management server 20 selects, from the volume management table 228, all of the records with which the identifier of the selected storage subsystem 30 and the storage number 2282 in the volume management table 228 coincide. The management server 20 extracts the logical volume number 2281 from each of the selected records.

Subsequently, the management server 20 selects, from the data characteristics table 226, the records with which the extracted logical volume number 2281 and the logical volume number 2262 in the data characteristics table 226 coincide. The management server 20 extracts the access frequency 2263 from each of the selected records. The management server 20 calculates an access frequency to each of the selected storage subsystems 30 by summing up all of the extracted access frequencies 2263.

Subsequently, the management server 20 forms a new record into the storage characteristics table 229. The management server 20 stores the identifier of each of the selected storage subsystems 30 into the storage number 2291 of the new record. The management server 20 stores the calculated access frequency to the storage subsystem 30 into the access frequency 2292 of the new record.

The management server 20 repeats the above processes until all of the storage subsystems 30 are selected. In this manner, the management server 20 forms the storage characteristics table 229.

Subsequently, the management server 20 rearranges the records in the storage characteristics table 229 in order from the larger access frequency 2292 in the storage characteristics table 229 (Step 171). The management server 20 updates the collecting level group management table 227.

Specifically speaking, the management server 20 selects the records in the storage characteristics table 229 one by one in order from the top.

The management server 20 extracts the storage number 2291 from the record which has been selected first. The management server 20 classifies the logical volumes 305 which are provided by the storage subsystem 30 identified by the extracted storage number 2291 into the high collecting level group.

That is, the management server 20 selects, from the volume management table 228, all of the records with which the extracted storage number 2291 and the storage number 2282 in the volume management table 228 coincide. The management server 20 extracts the logical volume number 2281 from the selected record.

Subsequently, the management server 20 selects, from the collecting level group management table 227, the records with which the extracted logical volume number 2281 and the logical volume number 2271 in the collecting level group management table 227 coincide. The management server 20 stores the "high collecting level group" into the collecting level group 2272 of each of the selected records. Thus, the management server 20 classifies the logical volumes 305 provided by the storage subsystem 30 whose access frequency is high into the high collecting level group.

The management server 20 extracts the storage number 2291 from the record which has been selected second. The management server 20 classifies the logical volumes 305 which are provided by the storage subsystem 30 identified by the extracted storage number 2291 into the middle collecting level group.

That is, the management server 20 selects, from the volume management table 228, all of the records with which the extracted storage number 2291 and the storage number 2282 in the volume management table 228 coincide. The management server 20 extracts the logical volume number 2281 from the selected record.

Subsequently, the management server 20 selects, from the collecting level group management table 227, the records in which the extracted logical volume number 2281 and the logical volume number 2271 in the collecting level group management table 227 coincide. The management server 20 stores the "middle collecting level group" into the collecting level group 2272 of each of the selected records.

The management server 20 extracts the storage number 2291 from the record which has been selected last. The management server 20 classifies the logical volumes 305 which are provided by the storage subsystem 30 identified by the extracted storage number 2291 into the low collecting level group.

That is, the management server 20 selects, from the volume management table 228, all of the records with which the extracted storage number 2291 and the storage number 2282 in the volume management table 228 coincide. The management server 20 extracts the logical volume number 2281 from the selected record.

Subsequently, the management server 20 selects, from the collecting level group management table 227, the records with which the extracted logical volume number 2281 and the logical volume number 2271 in the collecting level group management table 227 coincide. The management server 20 stores the "low collecting level group" into the collecting level group 2272 of each of the selected records. Thus, the management server 20 classifies the logical volumes 305 provided by the storage subsystem 30 whose access frequency is low into the low collecting level group.

Further, the management server 20 updates the collection item information table 221 on the basis of the collecting level group definition table 222 and the updated collecting level group management table 227. Since the updating process of the collection item information table 221 is the same as that included in Step 122 of the collecting level group changing process (FIG. 14) in the second embodiment, its detailed explanation is omitted.

In this manner, the management server 20 changes the correspondence between the logical volume 305 and the collecting level group on a unit basis of the storage subsystem 30 (Step 172). The management server 20 finishes the collecting level group changing process.

As mentioned above, according to the third embodiment, the management server 20 changes the correspondence between the logical volume 305 and the collecting level group on a unit basis of the storage subsystem 30 on the basis of the access frequency to the storage subsystem 30. The management server 20 may change the correspondence between the logical volume 305 and the collecting level group on the basis of other performance information of the storage subsystem 30 instead of the access frequency.

Fourth Embodiment

In the fourth embodiment, the management server 20 collects the performance information of the virtual volumes and summarizes the collected performance information.

Figure 20:
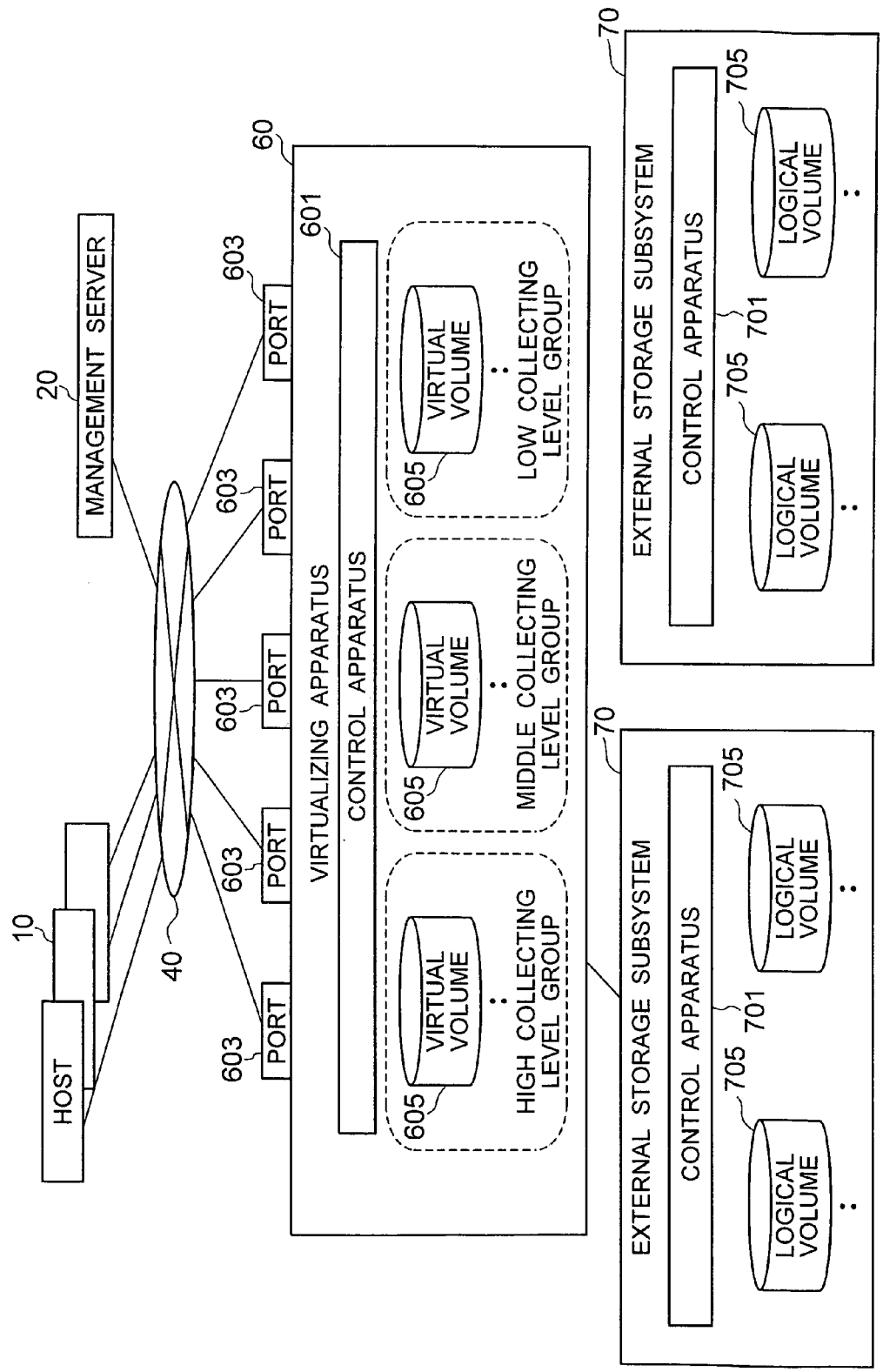
FIG. 20 is a block diagram showing a construction of a computer system according to the fourth embodiment of the invention.

FIG. 20 is a block diagram showing a construction of a computer system according to the fourth embodiment of the invention.

The computer system of the fourth embodiment includes the host computers 10, the management server 20, a virtualizing apparatus 60, external storage subsystems 70, and the SAN 40.

In the fourth embodiment, the SAN 40 connects the host computers 10 and the virtualizing apparatus 60. The external storage subsystems 70 are connected to the virtualizing apparatus 60.

Each of the external storage subsystems 70 has a control apparatus 701 and physical disks. The control apparatus 701 controls the writing and reading operations of the data to/from the physical disks. The control apparatus 701 provides storage areas of the physical disks as one or more logical volumes 705 to the virtualizing apparatus 60.

The virtualizing apparatus 60 has a control apparatus 601 and ports 603. The ports 603 are connected to the host computers 10 through the SAN 40.

The control apparatus 601 provides the logical volumes 705 provided by the external storage subsystem 70 as virtual volumes 605 to the host computer 10. The host computer 10 recognizes the virtual volumes 605 as volumes provided for the virtualizing apparatus 60.

When a writing request of the data to the virtual volume 605 is received, the control apparatus 601 transfers the data to the external storage subsystem 70. Thus, the control apparatus 701 of the external storage subsystem 70 writes the data into the logical volume 705 corresponding to the virtual volume 605 to which the writing of the data has been requested.

The virtualizing apparatus 60 may have a physical disk to store the data whose writing has been requested by the host computer 10. In this case, the control apparatus 601 of the virtualizing apparatus 60 provides storage areas of the physical disks as one or more logical volumes to the host computer 10. That is, in addition to the virtual volumes 605, the control apparatus 601 may also provide logical volumes to the host computer 10.

The host computer 10 has a processor, a memory, and an interface. The processor provided for the host computer 10 executes various processes by executing programs stored in the memory. The memory provided for the host computer 10 stores the programs which are executed by the processor and the data or the like which is necessary for the processor. The interface provided for the host computer 10 is connected to the virtualizing apparatus 60 through the SAN 40.

The host computer 10 writes the data into the virtual volumes 605 which are provided by the virtualizing apparatus 60. The host computer 10 reads out the data from the virtual volumes 605 which are provided by the virtualizing apparatus 60.

The management server 20 may be either the management server provided for the computer system of the first embodiment or the management server provided for the computer system of the second embodiment. In the embodiment, the management server 20 classifies the virtual volumes 605 into one of the high collecting level group 310, the middle collecting level group 320, and the low collecting level group 330. The management server 20 in the embodiment handles the virtual volumes 605 in a manner similar to the logical volumes and executes various processes.

In the embodiment, the management server 20 can change the collection item, collecting interval, and summarizing conditions of the performance information of each of the virtual volumes 605 every collecting level group. Specifically speaking, the management server 20 can change the collection item, collecting interval, and summarizing conditions of the performance information of each of the virtual volumes 605 in accordance with the state monitoring load or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of monitoring performance in a computer system having:
    at least one host computer;
    one or more storage subsystems connected to said host computer; and
    a management computer connected to said storage subsystems,
    wherein each of said storage subsystems has physical disks for storing data and a disk controller for controlling input/output of the data to/from said physical disks, the method comprising:
    providing storage areas of said physical disks as logical volumes to said host computer;
    defining a plurality of performance data collecting frequency level groups, each group defined by a set of performance data collection items to be collected at fixed collection intervals defined for said group;
    selecting a correspondence between said logical volumes and said performance data collecting frequency level groups, such that each of said logical volumes corresponds to only one of said performance data collecting frequency level groups;
    monitoring performance information of said logical volumes each corresponding to each performance data collecting frequency level group at each of said collection intervals; and
    changing the collection interval if the correspondence between one of said logical volumes and said group is changed, and if the amount of performance data exceeds a threshold.

2. The method according to claim 1, wherein said monitoring conditions include at least one of an item of the performance information which is collected from said logical volumes, a collecting interval of said performance information, and conditions in which said performance information is summarized.

3. The method according to claim 1, wherein when the data stored in one of said logical volumes is moved to another logical volume, said management computer changes the correspondence between said one logical volume and said group.

4. The method according to claim 1, wherein
    said computer system includes a plurality of storage subsystems, and
    said management computer makes all of the logical volumes which are provided by one of said plurality of storage subsystems correspond to the same group.

5. The method according to claim 1, wherein
    said computer system includes one storage subsystem, and
    said management computer makes each of the logical volumes which are provided by said one storage subsystem correspond to one of said plurality of groups.

6. The method according to claim 1, wherein
    when the correspondence between one of said logical volumes and said group is changed, a load state of at least either said management computer or said storage subsystem is obtained, and
    the monitoring conditions set to at least one of said plurality of groups are changed in accordance with said obtained load state.

7. The method according to claim 1, wherein
    said monitoring conditions include an obtaining interval of said performance information, and
    when the correspondence between one of said logical volumes and said group is changed, said management computer changes the monitoring conditions in order from the group in which the obtaining interval of said performance information is longer.

8. A computer which is connected to one or more storage subsystems,
    each of said storage subsystems having physical disks for storing data whose writing is requested by a host computer and a disk controller for controlling input/output of the data to/from said physical disks, said disk controller providing storage areas of said physical disks as one or more logical volumes to said host computer, said computer comprising:
a memory;
an interface with said storage subsystems; and
a processor configured to:
define a plurality of performance data collecting frequency level groups, each group defined by a set of performance data collection items to be collected at fixed collection intervals defined for said group;
select a correspondence between said logical volumes and said performance data collecting frequency level groups, such that each of said logical volumes corresponds to only one of said performance data collecting frequency level groups;
monitor performance information of said logical volumes each corresponding to each performance data collecting frequency level group at each of said collection intervals; and
change the collection interval if the correspondence between one of said logical volumes and said group is changed, and if the amount of performance data exceeds a threshold.

9. The computer according to claim 8, wherein said monitoring conditions include at least one of an item of the performance information which is collected from said logical volumes, a collecting interval of said performance information, and conditions in which said performance information is summarized.

10. The computer according to claim 8, wherein when the data stored in one of said logical volumes is moved to another logical volume, said processor changes the correspondence between said one logical volume and said group.

11. The computer according to claim 8, wherein
said computer is connected to a plurality of storage subsystems, and
said processor makes all of the logical volumes which are provided by one of said plurality of storage subsystems correspond to the same group.

12. The computer according to claim 8, wherein
said computer is connected to one storage subsystem, and
said processor makes each of the logical volumes which are provided by said one storage subsystem correspond to one of said plurality of groups.

13. The computer according to claim 8, wherein when the correspondence between one of said logical volumes and said group is changed, said processor obtains a load state of at least either said computer or said storage subsystem and changes the monitoring conditions set to at least one of said plurality of groups in accordance with said obtained load state.

14. The computer according to claim 8, wherein said monitoring conditions include an obtaining interval of said performance information, and when the correspondence between one of said logical volumes and said group is changed, said processor changes the monitoring conditions in order from the group in which the obtaining interval of said performance information is longer.

15. A computer system comprising:
one or more host computers each having a processor, a memory, and an interface;
a virtualizing apparatus which is connected to said host computers;
one or more storage subsystems which are connected to said virtualizing apparatus; and
a management computer which is connected to said virtualizing apparatus,
wherein each of said storage subsystems has physical disks for storing data and a disk controller for controlling input/output of the data to/from said physical disks,
said disk controller provides storage areas of said physical disks as one or more logical volumes to said virtualizing apparatus,
said virtualizing apparatus provides said provided logical volumes as virtual volumes to which the writing of the data is requested by said host computer to said host computer and said management computer, and
said management computer:
defines a plurality of performance data collecting frequency level groups, each group defined by a set of performance data collection items to be collected at fixed collection intervals defined for the group;
selects a correspondence between said virtual volumes and said performance data collecting frequency level groups, such that each of said virtual volumes corresponds to only one of said performance data collecting frequency level groups;
monitors performance information of said virtual volumes each corresponding to each performance data collecting frequency level group at each of said collection intervals; and
changes the collection interval if the correspondence between one of said virtual volumes and said group is changed, and if the amount of performance data exceeds a threshold.

16. The system according to claim 15, wherein said virtualizing apparatus has a physical disk to store the data whose writing is requested by said host computer.

17. The method according to claim 2, wherein said item of the performance information collected from said logical volumes is an I/O response time, a number of I/O times, a disk occupation ratio, or a number of cyclic redundancy check (CRC) errors.

18. The method according to claim 1, further comprising:
discriminating at least a normal state and a state of increase in collecting costs, for each of the groups, and
defining respective sets of collecting intervals for each of the states, at least one of the set of collecting intervals of the state of increase in collecting costs being longer than a corresponding one of the set of collecting intervals of the normal state.

19. The method according to claim 1, further comprising: changing the correspondence between said one of said logical volumes and said group based upon an access frequency to said one of said logical volumes.

20. The method according to claim 1, further comprising: changing a correspondence between said groups and said storage subsystems, each of which is configured to provide some of said logical volumes, based upon an access frequency to one of said storage subsystem.

* * * * *